(12) United States Patent
Hirata et al.

(10) Patent No.: US 9,458,291 B2
(45) Date of Patent: Oct. 4, 2016

(54) POLYCARBONATE COPOLYMER

(71) Applicant: Idemitsu Kosan Co., Ltd., Chiyoda-ku, Tokyo (JP)

(72) Inventors: Kengo Hirata, Sodegaura (JP); Hironobu Morishita, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 14/379,971

(22) PCT Filed: Feb. 21, 2013

(86) PCT No.: PCT/JP2013/000975
§ 371 (c)(1),
(2) Date: Aug. 20, 2014

(87) PCT Pub. No.: WO2013/125229
PCT Pub. Date: Aug. 29, 2013

(65) Prior Publication Data
US 2015/0010859 A1    Jan. 8, 2015

(30) Foreign Application Priority Data
Feb. 22, 2012  (JP) .................. 2012-036345

(51) Int. Cl.
| C08G 64/10 | (2006.01) |
| C08G 64/14 | (2006.01) |
| C08G 64/06 | (2006.01) |
| C08G 64/28 | (2006.01) |
| C09D 169/00 | (2006.01) |
| G03G 5/07 | (2006.01) |
| G03G 5/05 | (2006.01) |

(52) U.S. Cl.
CPC ............. *C08G 64/14* (2013.01); *C08G 64/06* (2013.01); *C08G 64/28* (2013.01); *C09D 169/00* (2013.01); *G03G 5/0564* (2013.01); *G03G 5/0589* (2013.01); *G03G 5/0596* (2013.01); *G03G 5/075* (2013.01)

(58) Field of Classification Search
CPC ........ G03G 5/05; G03G 5/075; C08G 64/06; C08G 64/14; C08G 64/28; C09D 169/00
See application file for complete search history.

(56) References Cited

U.S. PATENT DOCUMENTS
| 5,213,924 A | 5/1993 | Sakamoto |
| 8,372,942 B2 | 2/2013 | Hirata |
| 2011/0287354 A1 | 11/2011 | Hirata |
| 2012/0100474 A1 | 4/2012 | Hikosaka et al. |

FOREIGN PATENT DOCUMENTS
| CN | 102272681 A | 12/2001 | |
| JP | H4-179961 A | 6/1992 | |
| JP | 2004-354759 A | 12/2004 | |
| JP | 2005-126727 A | 5/2005 | |
| JP | 2007-119691 A | 5/2007 | |
| JP | 2011-026574 A | 2/2011 | |
| JP | 2011-026577 | * 2/2011 | ............. C08G 64/06 |
| JP | 2011-026577 A | 2/2011 | |

OTHER PUBLICATIONS

Translation of JP 2011-026577 published Feb. 2011.*
Chinese Office Action corresponding to Application No. 201380004312.3, dated Jul. 29, 2015.
International Preliminary Report on Patentability and Written Opinion dated Aug. 26, 2014 issued in Application No. PCT/JP2013/000975.
International Search Report dated Mar. 19, 2013 issued in Application No. PCT/JP2013/000975.

* cited by examiner

*Primary Examiner* — Peter Vajda
(74) *Attorney, Agent, or Firm* — Foley & Lardner LLP

(57) ABSTRACT

A polycarbonate copolymer including a repeating unit represented by the following formula (1) and having a copolymerization molar ratio represented by $Ar^2/(Ar^1+Ar^2)$ of 30 mol % or more and 47 mol % or less. In the formula (1), $Ar^1$ is a group represented by the following formula (2a) or (2b) and $Ar^2$ is a group represented by the following formula (3); and n is an average number of repetition and is 1.12 or more and 2.34 or less.

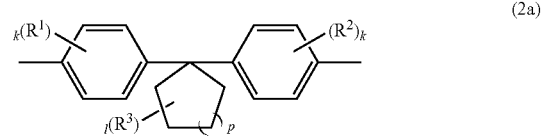

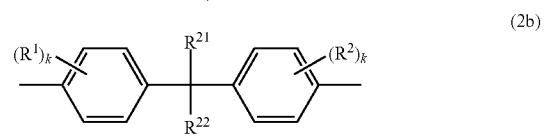

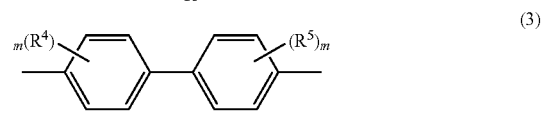

6 Claims, No Drawings

POLYCARBONATE COPOLYMER

CROSS REFERENCE TO RELATED APPLICATIONS

This application is the National Phase of PCT/JP2013/000975, filed Feb. 21, 2013, which claims priority to Japanese Application No. 2012-036345, filed Feb. 22, 2012.

TECHNICAL FIELD

The invention relates to a polycarbonate copolymer, a coating liquid containing the same and an electrophotographic photoreceptor containing the same.

BACKGROUND ART

Due to excellent mechanical properties, thermal properties and electric properties, polycarbonate resins are used as a raw material of a molded product in various industrial fields. In recent years, polycarbonate resins are widely used in functional products that utilize in combination optical properties of polycarbonate resins.

With such an expansion of application fields, properties required of polycarbonate resins have come to be diversified. Polycarbonate resins prepared by using as raw materials 2,2-bis(4-hydroxyphenyl)propane or 1,1-bis(4-hydroxyphenyl)cyclohexane, that have conventionally been used, often cannot meet such request sufficiently. Therefore, polycarbonate resins having various chemical structures have been proposed in accordance with the application and required properties.

As products utilizing electric and optical properties of polycarbonate resins, an organic electrophotographic photoreceptor utilizing a polycarbonate resin as a binder resin for a functional material such as a charge-generating material and a charge-transporting material can be given.

An organic electrophotographic photoreceptor is required to have prescribed sensitivity, electric properties and optical properties according to electrophotographic processes.

In the case of an organic electrophotographic photoreceptor, operations such as corona discharge, toner development, transfer to paper, cleaning or the like are conducted repeatedly on the surface of the photosensitive layer thereof. Therefore, whenever these operations are conducted, an electric or mechanical external force is applied to the surface of the photosensitive layer. Therefore, in order to maintain the image quality of an electrophotography over long periods, the photosensitive layer provided on the surface of an electrophotographic photoreceptor is required to have resistance to these external forces.

Further, an organic electrophotographic photoreceptor is normally produced by a method in which a binder resin is dissolved in an organic solvent together with a functional material, and the resulting mixture is formed into a film on a conductive base by casting, and hence, it is required to have solubility and stability for an organic solvent.

Conventionally, as a binder resin for a photoreceptor, a polycarbonate resin prepared by using, as a raw material, 2,2-bis(4-hydroxyphenyl)propane or 2,2-bis(4-hydroxyphenyl)cyclohexane has been used. These resins do not have sufficient durability. Therefore, in order to meet these requirements, various techniques have been developed.

As an effective technology for improving wear resistance of the photosensitive layer, use of a polycarbonate copolymer is known.

For example, a resin disclosed in Patent Document 1 is produced by copolymerizing a bisphenol Z skeleton having good solubility with biphenol having wear resistance. However, the amount of the biphenol component is at most about 23 mol % in terms of copolymerization ratio since the polycarbonate oligomer as the raw material is a di- to tetramer. The resin disclosed in Patent Document 1 does not have sufficient wear resistance, and hence, further improvement in wear resistance has been required.

Patent Documents 2 and 3 each disclose a polymer in which the copolymerization ratio of the skeleton having excellent wear resistance such as biphenol (that is produced from a raw material of which the number of monomers in an oligomer is reduced) has been increased to 25 to 47 mol %, and report that this polymer has significantly excellent wear resistance.

However, as for mechanical deterioration that occurs at the time of using toner containing a large amount of an external additive (filming, for example), the resins disclosed in Patent Documents 2 and 3 cannot sufficiently prevent. On the other hand, in these resin, the surface of a photoreceptor cannot be worn easily, there is a concern that whitening, black spots, streaks, insufficient cleaning or other phenomenon may occur.

Toner filming is a phenomenon in which an external additive in a toner is adhered to the outermost surface of the photosensitive layer, and the resin components in the toner are firmly adhered thereto with the portion where the additive is adhering being as the center. As a conventional means for solving this problem, a method in which wear resistance of a photoreceptor is lowered, whereby the surface on which filming occurs can be peeled off easily, or a method in which addition of a toner is suppressed by lowering the surface free energy of the drum surface, or other methods were conceived.

However, as for the former method, there is a problem that the drum durability is deteriorated and, as for the latter method, there is a problem that the surface properties cannot be maintained. Accordingly, it was difficult to produce a photoreceptor having excellent wear resistance and suffering no toner filming (mechanical deterioration).

RELATED ART DOCUMENTS

Patent Documents

Patent Document 1: JP-A-H4-179961
Patent Document 2: JP-A-2011-26574
Patent Document 3: JP-A-2011-26577

SUMMARY OF THE INVENTION

An object of the invention is to provide a copolymerized polycarbonate resin having excellent wear resistance, hardness and low surface free energy or to a provide a photoreceptor having excellent wear resistance and hardness and capable of suppressing occurrence of toner filming.

According to the invention, the following polycarbonate copolymer or the like are provided.

1. A polycarbonate copolymer comprising a repeating unit represented by the following formula (1) and having a copolymerization molar ratio represented by $Ar^2/(Ar^1+Ar^2)$ of 30 mol % or more and 47 mol % or less,

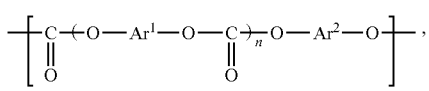

wherein in the formula (1), $Ar^1$ is a group represented by the following formula (2a) or (2b) and $Ar^2$ is a group represented by the following formula (3); and n is an average number of repetition and is 1.12 or more and 2.34 or less;

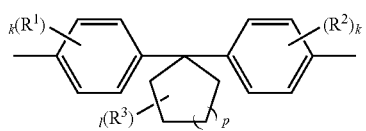

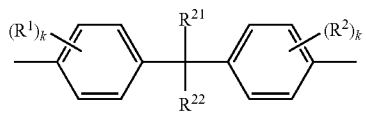

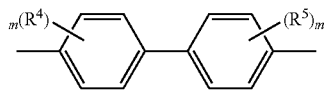

wherein in the formulas (2a) and (2b), $R^1$ to $R^3$ are independently an alkyl group including 1 to 10 carbon atoms or a fluoroalkyl group including 1 to 10 carbon atoms;

$R^{21}$ and $R^{22}$ are independently a hydrogen atom or an alkyl group including 1 to 3 carbon atoms, provided that $R^{21}$ and $R^{22}$ are different from each other;

in the formula (3), $R^4$ and $R^5$ are independently an alkyl group including 1 to 10 carbon atoms, a fluoroalkyl group including 1 to 10 carbon atoms or a substituted or unsubstituted aryl group including 6 to 12 carbon atoms; and in the formulas (2a), (2b) and (3), k is independently an integer of 1 to 4, m is independently an integer of 0 to 4, 1 is independently an integer of 0 to 4 and p is an integer of 1 to 2, and when k, l and m are 2 or more, a plurality of groups may be the same or different.

2. The polycarbonate copolymer according to 1, wherein the chain end is a monovalent aromatic group or a monovalent fluorine-containing aliphatic group.

3. The polycarbonate copolymer according to 1 or 2, wherein the reduction viscosity [ηsp/C] of a methylene chloride solution of the polycarbonate copolymer having a concentration of 0.5 g/dl at a temperature of 20° C. is 0.79 to 1.79 dl/g;

the coefficient of viscosity of a tetrahydrofuran solution of the polycarbonate copolymer having a concentration of 10 wt % at a temperature of 20° C. is less than 500 cp; and when the reduction viscosity is taken as X, the coefficient of viscosity is not more than a value (Y) calculated by the following equation:

$$Y = 14.301 \times e^{2.2781X}$$

wherein e is the base of natural logarithm (Napier's constant).

4. The polycarbonate copolymer according to any one of 1 to 3, wherein the group represented by the formula (2a) is a divalent group derived from 1,1-bis(3-methyl-4-hydroxyphenyl)cyclohexane, 1,1-bis(3-methyl-4-hydoxyphenyl)cyclopentane or 1,1-bis(3-trifluoromethyl-4-hydroxyphenyl)cyclohexane and the group represented by the formula (2b) is a divalent group derived from 2,2-bis(3-methyl-4-hydroxyphenyl)butane and 1,1-bis(3-methyl-4-hydroxyphenyl)ethane.

5. A coating liquid comprising the polycarbonate copolymer according to any one of 1 to 4 and an organic solvent.

6. An electrophotographic photoreceptor in which a photosensitive layer is provided on a conductive base, wherein the photosensitive layer comprises, as one component, the polycarbonate copolymer according to any one of 1 to 4.

According to the invention, it is possible to provide a polycarbonate copolymer resin having excellent wear resistance, hardness and low surface free energy and a photoreceptor having excellent wear resistance and hardness and is capable of suppressing toner filming.

Further, according to the invention, it is possible to provide a copolymerized polycarobonate having a significantly lower solution viscosity when the solution viscosity is measured at the same reduction viscosity as that of a conventional resin, and hence has excellent coating properties and mechanical properties.

When a photoreceptor is produced by using a polycarbonate resin having excellent wear resistance, hardness and low surface free energy, the resulting photoreceptor has excellent wear resistance, hardness and low surface free energy. If the photoreceptor has high hardness, sticking of an external additive in a toner can be prevented, and, by maintaining the low surface free energy, adhesion of a toner can be prevented, whereby occurrence of toner filming can be reduced.

Mode for Carrying Out the Invention

Hereinbelow, a detailed explanation will be made on the polycarbonate copolymer (PC copolymer) of the invention, the coating liquid using the same, and the electrophotographic photoreceptor prepared by using the PC copolymer or the coating liquid.

[PC Copolymer]

The PC copolymer of the invention has a structure comprising a repeating unit represented by the following formula (1) and has a copolymerization molar ratio represented by $Ar^2/(Ar^1+Ar^2)$ of 30 mol % or more and 47 mol % or less.

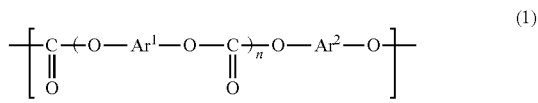

In the formula (1), $Ar^1$ is a group represented by the following formula (2a) or (2b); and $Ar^2$ is a group represented by the following formula (3); n is an average number of repetition of the unit shown in a parenthesis ($Ar^1$ block), and is 1.12 or more and 2.34 or less.

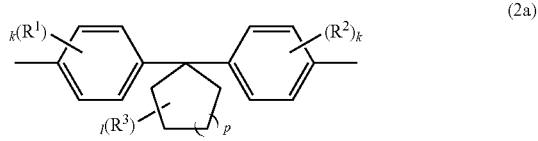

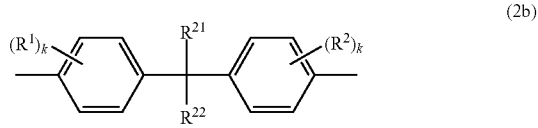

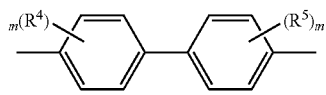
(3)

In the formulas (2a) and (2b), $R^1$ to $R^3$ are independently an alkyl group including 1 to 10 carbon atoms or a fluoroalkyl group including 1 to 10 carbon atoms;

$R^{21}$ and $R^{22}$ are independently hydrogen or an alkyl group including 1 to 3 carbon atoms, provided that $R^{21}$ and $R^{22}$ are different.

In the formula (3), $R^4$ and $R^5$ are independently an alkyl group including 1 to 10 carbon atoms, a fluoroalkyl group including 1 to 10 carbon atoms or a substituted or unsubstituted aryl group including 6 to 12 carbon atoms.

In the formulas (2a), (2b) and (3), k is independently an integer of 1 to 4, m is independently an integer of 0 to 4, 1 is independently an integer of 0 to 4, and p is an integer of 1 to 2. k is preferably 1. l is preferably 0. m is preferably 0 or 1. p is preferably 2.

When k, l and m are 2 or more, a plurality of groups may independently be the same or different.

In the PC copolymer of the invention, the content of the monomer unit of $Ar^2$ (copolymerization molar ratio: $Ar^2/(Ar^1+Ar^2)$) is 30 mol % or more and 47 mol % or less, preferably 33 mol % or more and 47 mol % or less, and particularly preferably 38 mol % or more and 45 mol % or less.

If $Ar^2$ exceeds 47 mol %, it becomes a copolymer having a structure with a high regularity that is similar to that of an alternating copolymer, and hence, the solubility may be lowered. If $Ar^2$ is less than 30 mol %, effects of improving wear resistance may be insufficient.

Further, in the case of a polymer having a block formed by bonding of $Ar^2$s, the block component formed of $Ar^2$ has a low solubility, and hence, when dissolved in an organic solvent, the polymer solution may be turbid. Hence, it is not preferable as a coating liquid.

The copolymerization molar ratio $Ar^2/(Ar^1+Ar^2)$ can be measured by nuclear magnetic resonance spectrum. Specifically, it can be obtained by the method stated in the Examples.

n is 1.12 or more and 2.34 or less. If n is less than 1.12, the regularity of the repeating unit becomes too high, whereby the properties of a crystalline monomer are significantly exhibited and the solubility may be deteriorated. If n exceeds 2.34, it becomes difficult to sufficiently increase the content of crystalline components contained in the resulting PC copolymer, resulting in poor effects of improving wear resistance. n is preferably 1.12 or more and 1.99 or less.

The PC copolymer of the invention is normally produced by a process in which, after the raw material monomer of the $Ar^1$ block is formed, the raw material monomer is reacted with a monomer containing $Ar^2$. Accordingly, n does not become a number of 1.0 or less.

n can be measured by nuclear magnetic resonance spectrum. Specifically, it can be obtained by the method stated in the Examples.

As examples of an alkyl group including 1 to 10 carbon atoms constituting $R^1$ to $R^5$, a linear alkyl group or a branched alkyl group can be mentioned. For example, a methyl group, an ethyl group, various propyl groups, various butyl groups, various pentyl groups and various hexyl groups can be given.

As examples of a fluoroalkyl group including 1 to 10 carbon atoms constituting $R^1$ to $R^5$, a group obtained by substituting the alkyl group including 1 to 10 carbon atoms with 1 or 2 or more fluorine atoms can be given, for example. For example, a trifluoromethyl group can be given.

As examples of an aryl group including 6 to 12 carbon atoms constituting $R^4$ and $R^5$, a phenyl group or the like can be given.

If the aryl group has a substituent, as examples of the substituent, an alkyl group including 1 to 6 carbon atoms can be given. As the alkyl group including 1 to 6 carbon atoms, the groups exemplified above with reference to $R^1$ to $R^5$ can be given.

As examples of an alkyl group including 1 to 3 carbon atoms constituting $R^{21}$ and $R^{22}$, a linear alkyl group and a branched alkyl group can be given. For example, a methyl group, an ethyl group, and various propyl groups can be given. One including 1 or 2 carbon atoms is preferable.

The PC copolymer of the invention have excellent mechanical properties, in particular, wear resistance and hardness. The coating liquid comprising the PC copolymer of the invention is an excellent coating liquid that does not suffer whitening, gelation or other troubles.

Further, by incorporating the PC copolymer of the invention in the photosensitive layer of the electrophotographic photoreceptor, an electrophotographic photoreceptor having excellent durability and suffering a small degree of deterioration of mechanical properties such as toner filming can be obtained. When the PC copolymer of the invention is used in the photosensitive layer of the electrophotographic photoreceptor, the surface hardness of the photoreceptor can be increased, and toner filming derived from adhesion of an external additive to the outermost surface of the photosensitive layer can be prevented or suppressed.

Further, the PC copolymer of the invention preferably has a reduction viscosity [ηsp/C] at 20° C. (a solution prepared by using methylene chloride as a solvent and having a concentration of 0.5 g/dl) of 0.1 dl/g or more and 5 dl/g or less, more preferably 0.2 dl/g or more and 3 dl/g or less, with 0.3 dl/g or more and 2.5 dl/g or less being particularly preferable. The reduction viscosity can be measured by the method mentioned in the Examples.

If the reduction viscosity [ηsp/C] is less than 0.1 dl/g, when the copolymer is used as an electrophotographic photoreceptor, wear resistance may be insufficient. Further, if the reduction viscosity [ηsp/C] exceeds 5 dl/g, when a formed product such as an electrophotographic photoreceptor is produced from a coating liquid, the coating viscosity becomes too high, productivity of a formed product such as an electrophotographic photoreceptor or the like may be deteriorated, and hence is not preferable.

It is preferred that the PC copolymer of the invention have a reduction viscosity [ηsp/C] of a methylene chloride solution having a concentration of 0.5 g/dl (20° C.) of 0.79 to 1.79 dl/g and that the viscosity coefficient of the tetrahydrofuran solution having a concentration of 10 wt % (20° C.) of less than 500 cp. A more preferable range of the reduction viscosity is 1.02 to 1.36 dl/g, and a more preferable range of the viscosity coefficient is less than 220 cp. As the relation between the reduction viscosity and the viscosity coefficient, when the reduction viscosity is taken as X, the viscosity coefficient is preferably a value (Y) calculated by the following formula:

$$Y = 14.301 \times e^{2.2781X}$$

(in the formula, e is the base of a natural logarithum (Napier's constant))

Since mechanical properties are derived from the viscosity-average molecular weight and the viscosity-average molecular weight is related with the reduction viscosity, an increase in reduction viscosity leads to an increase in mechanical properties. Further, as for coating properties, since it is derived from the viscosity coefficient, both the mechanical properties and the coating properties can be improved by allowing the viscosity coefficient to be Y or less in the above formula.

The viscosity coefficient can be measured by the method described in the Examples.

In the PC copolymer of the invention, in order to improve electric properties, it is preferred that the chain end be sealed with a monovalent aromatic group or a monovalent fluorine-containing aliphatic group. Further, if the chain end is sealed with a monovalent fluorine-containing aliphatic group, low surface free energy can be developed and toner adhesion can be suppressed.

The monovalent aromatic group may be a group containing an aromatic ring. It may be a group containing an aliphatic group such as an alkyl group or an oxy group (—O—). The monovalent fluorine-containing aliphatic group may be a group containing an aromatic group.

As the monovalent aromatic group constituting the chain end, an aryl group including 6 to 12 carbon atoms is preferable. As such aryl group, a phenyl group and a biphenyl group can be given, for example.

As the monovalent fluorine-containing aliphatic group constituting the chain end, a fluorine-containing alkyl group including 1 to 20 carbon atoms can be given.

As the alkyl group substituting the monovalent aromatic group, an alkyl group including 1 to 20 carbon atoms can be given. As other aliphatic groups than the alkyl group, an alkoxy group or the like can be given.

As the aromatic group substituting the monovalent fluorine-containing aliphatic group, the aromatic groups mentioned above can be given.

The aromatic group, the alkyl group, the fluorine-containing aliphatic group and the aromatic group as mentioned above may further comprise a substituent. As such a substituent, a halogen atom or an aryl group can be mentioned. As the halogen atom, a fluorine atom, a chlorine atom, a bromine atom or the like can be given. As the aryl group, the groups mentioned above can be given.

[Method for Producing PC Copolymer]

The PC copolymer of the invention can be obtained by reacting, for example, a bischloroformate oligomer that has a low molecular weight represented by the following formula (10) and a divalent phenolic compound (co-monomer) represented by the following formula (11) in the presence of a base.

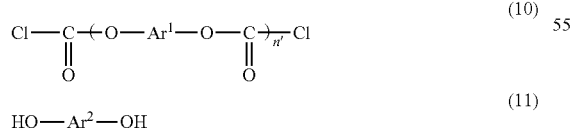

(10)

HO—Ar²—OH (11)

wherein $Ar^1$ and $Ar^2$ are the same as defined in the above formula (1), and n' is the average number of monomers of the bischloroformate oligomer represented by the formula (10).

n' is different from n in the formula (1). n and n' are almost the same values. Normally, n is larger. The reason therefor is as follows. When the oligomer represented by the formula (10) ($Ar^1$ oligomer) and the oligomer represented by the formula (11) are reacted, the chloroformate group at the end of the $Ar^1$ oligomer reacts with a base present in the reaction system to become a hydroxyl group. This hydroxyl group may be subjected to condensation polymerization with the $Ar^1$ oligomer of which the terminal is a chlorine atom.

In the bischloroformate oligomer represented by the formula (10), the average number n' of monomers is normally 1.0 or more and 1.99 or less. By using such bischloroformate oligomer, the production of the PC copolymer of the invention can be facilitated. The average number of monomers n' can be calculated by the method mentioned in the Examples.

The bischloroformate oligomer represented by the formula (10) is preferably a compound derived from a bisphenol compound represented by the following formula (20).

(In the formula, $Ar^1$ is the same as in the formula (1).)

As the bisphenol compound represented by the formula (20), for example, 1,1-bis(3-methyl-4-hydroxyphenyl)cyclohexane, 1,1-bis(2-methyl-4-hydroxyphenyl)cyclohexane, 1,1-bis(3-methyl-4-hydroxyphenyl)-3-methylcyclohexane, 1,1-bis(3-ethyl-4-hydroxyphenyl)cyclohexane, 1,1-bis(3-propyl-4-hydroxyphenyl)cyclohexane, 1,1-bis(3-butyl-4-hydroxyphenyl)cyclohexane, 1,1-bis(3-trifluoromethyl-4-hydroxyphenyl)cyclohexane, 1,1-bis(3-cyclohexyl-4-hydroxyphenyl)cyclohexane, 1,1-bis(3-phenyl-4-hydroxyphenyl)cyclohexane, 1,1-bis(3-methyl-4-hydroxyphenyl)-3-methylcyclohexane, 1,1-bis(3-methyl-4-hydroxyphenyl)cyclopentane, 1,1-bis(2-methyl-4-hydroxyphenyl)cyclopentane, 1,1-bis(3-methyl-4-hydroxyphenyl)-3-methylcyclopentane, 1,1-bis(3-ethyl-4-hydroxyphenyl)cyclopentane, 1,1-bis(3-propyl-4-hydroxyphenyl)cyclopentane, 1,1-bis(3-butyl-4-hydroxyphenyl)cyclopentane, 1,1-bis(3-trifluoromethyl-4-hydroxyphenyl)cyclopentane, 1,1-bis(3-cyclohexyl-4-hydroxyphenyl)cyclopentane, 1,1-bis(3-phenyl-4-hydroxyphenyl)cyclopentane, 1,1-bis(3-methyl-4-hydroxyphenyl)-3-methylcyclopentane, 2,2-bis(3-methyl-4-hydroxyphenyl)butane, 1,1-bis(3-methyl-4-hydroxyphenyl)ethane or the like can be given.

Among these, 1,1-bis(3-methyl-4-hydroxyphenyl)cyclohexane, 1,1-bis(3-ethyl-4-hydroxyphenyl)cyclohexane, 1,1-bis(3-trifluoromethyl-4-hydroxyphenyl)cyclohexane, 1,1-bis(3-methyl-4-hydroxyphenyl)cyclopentane, 2,2-bis(3-methyl-4-hydroxyphenyl)butane and 1,1-bis(3-methyl-4-hydroxyphenyl)ethane are preferable since they provide a PC copolymer having excellent mechanical properties and solubility. Further, they are preferable since they can provide an excellent coating liquid when used as a PC copolymer for an electrophotographic photoreceptor.

They may be used singly or in a combination of two or more.

An explanation will be made on a monomer represented by the formula (11).

As the monomer represented by the formula (11), bisphenol compounds such as 4,4'-biphenol, 3,3'-dimethyl-4,4'-biphenol, 3,3',5-trimethyl-4,4'-biphenol, 3-propyl-4,4'-biphenol, 3,3',5,5'-tetramethyl-4,4'-biphenol, 3,3'-diphenyl-4,4'-biphenol, 3,3'-dibutyl-4,4'-biphenol or the like can be given, for example. Among these, 4,4'-biphenol and 3,3'-dimethyl-4,4'-biphenol are preferable since a resin having excellent wear resistance can be obtained.

They may be used alone or in combination of two or more.

In respect of wear resistance, the monomer (11) is a divalent phenol monomer that has a solubility for the methylene chloride of the homopolymer of 2 mass % or less or that is substantially not capable of synthesizing a homopolymer having a number-average molecular weight of 10000 or more due to crystallization during the synthesis reaction of polycarbonate.

Whether the solubility for methylene chloride is 2 mass % or less or not can be confirmed by the following method.

2 parts by mass of a solid homopolymer having an organic solvent content of 500 mass ppm or less and a viscosity-average molecular weight of 15000 to 30000 is immersed in 98 parts by mass of methylene chloride at room temperature, and is allowed to stand for 24 hours. Thereafter, the solution is subjected to solid-liquid separation, and the solid part is dried. The solubility is checked by confirming whether a decrease in mass obtained by drying the solid part is 0.04 part by mass or more or not.

The PC copolymer of the invention can be obtained by subjecting the bischloroformate oligomer represented by the formula (10) and the monomer (11) to an interfacial condensation copolymerization.

For example, from the bisphenol compound represented by the formula (20), by using various dihalogenated carbonyl such as phosgene, the bischloroformate oligomer represented by the formula (10) is produced. Then, by conducting an interfacial condensation copolymerization in the presence of an acid binder, a carbonic acid ester bond can preferably be formed.

These reactions are conducted in the presence of a chain end terminator and/or a branching agent, if necessary. In the production of a PC copolymer of the invention, by using two or more monomers derived from $Ar^2$ (monomer represented by the formula (11)), it can be a polydimensional copolymer.

As the end terminator for forming a chain end, a monocarboxylic acid and its derivative, a monovalent phenol and its derivative can be used For example, p-tert-butylphenol, p-phenylphenol, p-cumylphenol, p-perfluoronnonylphenol, p-(perfluoronnonylphenyl)phenol, p-(perfluorohexyl)phenol, p-tert-perfluorobutylphenol, perfluorocutylphenol, perfluorohexyl phenol, 1-(P-hydroxybenzyl)perfluorodecane, p-[2-(1H,1H-perfluorotridodecyloxy)-1,1,1,3,3,3-hexafluoropropyl] phenol, 3,5-bis(perfluorohexyloxycarbonyl)phenol, perfluorododecyl p-hydroxybenzoate, p-(1H,1H-perfluorocutlyoxy)phenol, 2H,2H,9H-perfluorononanic acid or the like can be given.

As the chain end terminator, fluorine-containing alcohol represented by the following formula (30) or (31) or 1,1,1,3,3,3-tetrafluoro-2-propanol or the like can also be preferably used. In addition, fluorine-containing alcohol represented by the following formulas (14), (15) and (16) in which an ether bond is present can preferably be used.

$$H(CF_2)_nCH_2OH \tag{30}$$

$$F(CF_2)_mCH_2OH \tag{31}$$

(wherein n is an integer of 1 to 12 and m is an integer of 1 to 12.)

$$F—(CF_2)n^{31}\text{-}OCF_2CH_2—OH \tag{14}$$

$$F—(CF_2CF_2)n^{32}\text{-}(CF_2CF_2O)n^{33}\text{-}CF_2CH_2—OH \tag{15}$$

$$C(R)_3—(CF_2)n^{35}\text{-}O—(CF_2CF_2O)n^{34}\text{-}CF_2CH_2—OH \tag{16}$$

wherein $n^{31}$ is an integer of 1 to 10 (preferably 5 to 8), $n^{32}$ is an integer of 0 to 5 (preferably 0 to 3), $n^{33}$ is an integer of 1 to 5 (preferably 1 to 3), $n^{34}$ is an integer of 1 to 5 (preferably 1 to 3), and $n^{35}$ is an integer of 0 to 5 (preferably 0 to 3). R is $CF_3$ or F.

As the above-mentioned fluorine-containing alcohol having an ether bond, the following compounds can be given, for example.

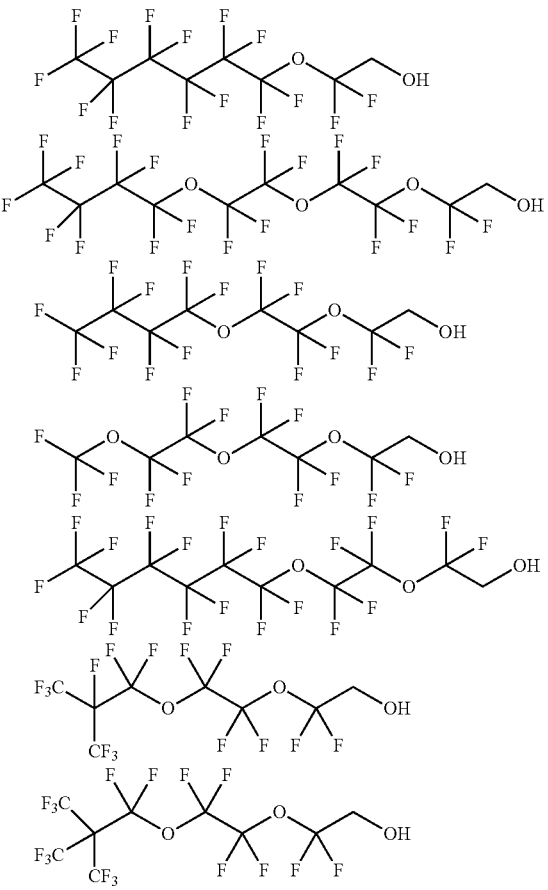

The amount of the chain end terminator added is, in terms of copolymerization composition ratio, preferably 0.05 mol % or more and 30 mol % or less and further preferably 0.1 mol % or more and 10 mol % or less. If the amount of the chain end terminator exceeds 30 mol %, mechanical strength may be lowered, and if the amount is less than 0.05 mol %, formability may be lowered.

As specific examples of branching agents, fluoroglycine, pyrrogallol, 4,6-dimethyl-2,4,6-tris(4-hydroxyphenyl)-2-heptene, 2,6-dimethyl-2,4,6-tris(4-hydroxyphenyl)-3-heptene, 2,4-dimethyl-2,4,6-tris(4-hydroxyphenyl)heptane, 1,3,5-tris(2-hydroxyphenyl)benzene, 1,3,5-tris(4-hydroxyphenyl)benzene, 1,1,1-tris(4-hydroxyphenyl) ethane, tris(4-hydroxyphenyl)phenylmethane, 2,2-bis[4,4-bis(4-hydroxyphenyl)cyclohexyl]propane, 2,4-bis[2-bis(4-hydroxyphenyl)-2-propyl]phenol, 2,6-bis(2-hydroxy-5-methylbenzyl)-4-methylphenol, 2-(4-hydroxyphenyl)-2-(2, 4-dihydroxyphenyl)propane, tetrakis(4-hydroxyphenyl) methane, tetrakis[4-(4-hydroxyphenyl isopropyl)phenoxy] methane, 2,4-dihydroxybenzoate, trimesic acid, cyanuric acid, 3,3-bis(3-methyl-4-hydroxyphenyl)-2-oxo-2,3-dihydroindole, 3,3-bis(4-hydroxyaryl)oxyindole, 5-chloroisatin, 5,7-dichloroisatin, 5-bromoisatin or the like can be given.

The amount of these branching agents added is, in terms of copolymerization composition ratio, normally 30 mol % or less, preferably 5 mol % or less. If the amount of the branching agent exceeds 30 mol %, formability may be deteriorated.

When an interfacial polycondensation is conducted, as an acid binder, for example, alkali metal hydroxides such as sodium hydroxide, potassium hydroxide, lithium hydroxide, cesium hydroxide or the like, alkaline earth metal hydroxides such as magnesium hydroxide and calcium hydroxide; alkali metal weak acid salts and alkaline earth metal weak acid salts such as sodium carbonate, potassium carbonate, calcium acetate or the like; organic bases such as pyridine or the like can be given. Among them, preferable are alkali metal hydroxides such as sodium hydroxide, potassium hydroxide, calcium hydroxide or the like, and alkaline earth metal hydroxides.

These acid binders may be used singly or in combination.

The amount of an acid binder may be appropriately adjusted taking the chemical stoichiometric ratio (equivalent) of the reaction into consideration. Specifically, the amount is one equivalent or excessive equivalent amount, more preferably 1 to 10 equivalents, per mole of the total of the hydroxide group of the divalent phenol as the raw material.

No specific restrictions are imposed on the solvent, as long as it shows solubility that is equal to or larger than the specific value for the resulting copolymer.

For example, aromatic hydrocarbon such as toluene and xylene; halogenated hydrocarbon such as methylene chloride, chloroform, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane and chlorobenzene; ketones such as cyclohexanone, aceton, and acetophenone; and an ether such as tetrahydrofuran and 1,4-dioxane can be given as preferable solvents.

These solvents may be used alone or in combination of two or more. Further, an interfacial polycondensation reaction may be conducted by using two types of solvents which are not mixed with each other.

As the catalyst, tertiary amines such as trimethylamine, triethylamine, tributylamine, N,N-dimethylcyclohexylamine, pyridine, N,N-diethylaniline and N,N-dimethylaniline; quaternary ammonium salts such as trimethylbenzyl ammonium chloride, triethylbenzyl ammonium chloride, tributylbenzyl ammonium chloride, trioctylmethyl ammonium chloride, tetrabutyl ammonium chloride, and tetrabutyl ammonium bromide; and quaternary phosphonium salt such as tetrabutyl phosphonium chloride and tetrabutyl phosphonium bromide are preferable.

Further, according to need, a small amount of an antioxidant such as sodium sulfite and hydrosulfite may be added to this reaction system.

The method for producing the PC copolymer of the invention will be explained in more detail.

The PC copolymer of the invention can be produced by various methods. For example, it can be produced by a method in which a bisphenol compound represented by the formula (20) and phosgene or the like are reacted to produce a low-molecular product (10) of a bischloroformate oligomer, and this bischloroformate oligomer is reacted with a divalent phenol compound represented by the formula (11) in the presence of an alkali aqueous solution containing a solvent and an acid binder. This method is preferable since the n value in the formula (1) can be adjusted in a preferable range.

As the method for producing a bischloroformate oligomer (10), the following method is preferable since the cleaning process at the time of producing the PC copolymer can be simplified or other reasons.

The method described below is preferable since a bischloroformate oligomer having an n' value in the formula (10) of 1.0 or more and 1.99 or less can be produced.

First, a bisphenol compound represented by the formula (20) is suspended in a hydrophobic solvent such as methylene chloride, and then phosgene is added to form a mixture solution. On the other hand, a tertiary amine such as triethylamine is dissolved in a hydrophobic solvent such as methylene chloride to form a solution. This solution is added dropwise to the above-mentioned mixture solution to conduct a reaction at a temperature that is not higher than room temperature. A remaining liquid of the resulting reaction mixture is washed by adding hydrochloric acid and pure water, whereby a polycarbonate oligomer (10) having a small number of monomers is obtained.

The temperature of the dropwise addition and the reaction temperature are normally 0 to 70° C., preferably 5 to 65° C. The dropwise addition time and the reaction time are both normally 15 minutes to 4 hours, preferably about 30 minutes to 3 hours. The average number of monomers (n') of the thus obtained polycarbonate oligomer is preferably 1.00 or more and 1.99 or less, further preferably 1.00 or more and 1.60 or less.

In an organic phase containing the low-molecular weight bischloroformate oligomer (10) thus obtained, an aromatic divalent phenol monomer of the formula (11) is added to allow them to react. The reaction temperature is normally 0 to 150° C., preferably 5 to 40° C., and particularly preferably 10 to 25° C.

The reaction can be conducted under reduced pressure, normal pressure or under pressure. Normally, the reaction can be preferably conducted at about normal pressure or at a self pressure of the reaction system. The reaction time depends on the reaction temperature, and normally it is 0.5 minute to 10 hours, and preferably about 1 minute to 3 hours.

In this reaction, it is desired that the aromatic divalent phenol monomer represented by the formula (11) be added in the form of an aqueous solution or an organic solvent solution. No specific restrictions are imposed on the order of addition.

In the above-mentioned production method, the catalyst, the end terminator, the branching agent or the like can be added at the time of producing a bischloroformate oligomer or a polymerization reaction after the oligomer production or both, according to need.

The PC copolymer thus obtained is a copolymer comprising a repeating unit represented by the following formula (40) and a repeating unit represented by the following formula (41).

Within a range that does not impair the attainment of the object of the invention, this PC copolymer may contain a polycarbonate unit having a structural unit other than $Ar^1$ and $Ar^2$ or a unit having a polyester structure or a polyether structure.

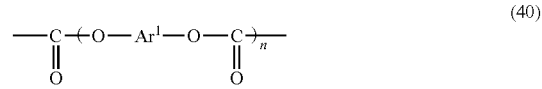

(40)

(41)

The reduction viscosity [ηsp/C] of the PC copolymer can be in the above-mentioned range by various methods such as the selection of the above-mentioned reaction conditions, the amount of the branching agent or the chain end terminator, or the like.

Further, according to circumstances, by subjecting the PC copolymer to a physical treatment (mixing, fraction, or the like) and/or a chemical treatment (polymer reaction, cross-linking treatment, partial decomposition or the like) appropriately, a predetermined reduction viscosity [ηsp/C] can be obtained.

By subjecting the resulting reaction product (crude product) to a post treatment such as a known separation purification method or the like, one having a desired purity (degree of purification) can be collected as a PC polymer.

[Coating Liquid]

The coating liquid of the invention at least comprises the PC copolymer of the invention and an organic solvent that can dissolve or disperse this copolymer.

The coating liquid of the invention may comprise, in addition to the above-mentioned components, a low-molecular compound, a colorant such as a dye and a pigment, a functional compound such as a charge-transporting material, an electron-transporting material, a hole-transporting material and a charge-generating material; a filler such as organic or inorganic fillers, fibers and fine particles, an additive such as an antioxidant, an ultraviolet absorber, an acid scavenger or the like.

As the material that can be contained other than the resin (PC copolymer), for example, those included in an electrophotographic photoreceptor mentioned later can be given.

In a range that does not impair the advantageous effects of the invention, the coating liquid may contain other resins. For example, those included in an electrophotographic photoreceptor mentioned later can be given.

Taking into consideration the solubility, dispersibility, viscosity, evaporation speed, chemical stability, stability to physical changes or the like of the PC copolymer and other materials, the organic solvent may be used alone or in combination of two or more.

The organic solvent is given as examples of the constituent components of an electrophotographic photoreceptor mentioned later.

The concentration of the PC copolymer components of the invention in the coating liquid may be a concentration that gives an adequate viscosity that is suited to the application of the coating liquid. The concentration is preferably 0.1 mass % or more and 40 mass % or less, further preferably 1 mass % or more and 35 mass % or less, and most preferably 5 mass % or more and 30 mass % or less.

If the concentration exceeds 40 mass %, the coating property may be deteriorated due to an excessively high viscosity. If the concentration is less than 0.1 mass %, the coating liquid flows due to a low viscosity and hence a homogenous coating film may not be obtained or due to a low concentration, drying after the coating may take a long time or the intended film thickness may not be obtained.

In the coating liquid of the invention, the PC copolymer of the invention may be used alone or in combination of two or more.

The PC copolymer of the invention has good compatibility with the charge-transporting material mentioned later. In addition, when dissolved in a solvent, it does not cause whitening or gelation. Accordingly, when the coating liquid of the invention contains a PC copolymer, a charge-transporting material and a solvent, it can be stored stably for a long period of time without causing whitening or gelation of polymer components.

Further, when the photosensitive layer of an electrophotograhic photoreceptor is formed by using this coating liquid, since the photosensitive layer does not cause crystallization, an excellent electrophotographic photoreceptor that does not cause defects in image quality can be prepared.

The ratio of the PC copolymer and the charge-transporting material in the coating liquid is normally 20:80 to 80:20, preferably 30:70 to 70:30, in terms of mass ratio.

Normally, the coating liquid of the invention is preferably used for formation of a charge-transporting layer of a stacked type electrophotographic photoreceptor in which the photosensitive layer at least includes a charge-generating layer and a charge-transporting layer.

By further incorporating the above-mentioned charge-generating material into the coating liquid of the invention, the coating liquid can be used for formation of the photosensitive layer of a single-layer type electrophotographic photoreceptor.

[Electrophotographic Photoreceptor]

The electrophotographic photoreceptor of the invention has a configuration in which a photosensitive layer is provided on a conductive base, and the photosensitive layer comprises the PC copolymer of the invention.

The photosensitive layer may have any configuration as long as it comprises the PC copolymer of the invention, and any known configuration can be taken.

A preferable electrophotographic photoreceptor is a stacked type electrophotographic photoreceptor in which the photosensitive layer contains at least one charge-generating layer and at least one charge-transporting layer or a single-layer type electrophotographic photoreceptor in which one photosensitive layer contains a charge-generating material and a charge-transporting material.

The PC copolymer of the invention can be used in any part of the photosensitive layer. However, in order to allow the effects of the invention to be fully exhibited, it is desired that it be used as a binder resin of a charge-transporting material in the charge-transporting layer in a stacked type electrophotographic photoreceptor, or as a binder resin of a single photosensitive layer in a single-layer type electrophotographic photoreceptor, or as a surface protective layer of a stacked type or a single-layer type electrophotographic photoreceptor.

In the case where a stacked-type electrophotographic photoreceptor having two charge-transporting layers, it is preferred that the PC copolymer of the invention be used in one of these charge-transporting layer.

In the electrophotographic photoreceptor of the invention, the PC copolymer of the invention may be used alone or in combination of two or more. Further, as long as the object of the invention is not impaired, binder resin components such as other polycarbonates such as bisphenol Z, bisphenol B and bisphenol E polycarbonates or a binder resin component such as polyarylate may be appropriately contained. In particular, combination of the PC copolymer of the invention with a bisphenol B polycarbonate is preferable since the effects of the invention can be fully exhibited without impairing the attainment of the object of the invention.

Further, an additive such as an antioxidant may be incorporated.

The electrophotographic photoreceptor of the invention is one in which a photosensitive layer is provided on a conductive base.

In the case of a stacked type electrophotographic photoreceptor in which the photosensitive layer comprises the charge-generating layer and the charge-transporting layer, the charge-transporting layer may be stacked on a charge-generating layer, or the charge-generating layer may be stacked on a charge-transporting layer.

If need arises, a conductive or insulative protective film may be formed on the surface of an electrophotographic photoreceptor. Further, an intermediate layer such as an adhesive layer for improving the adhesion between layers or a blocking layer for blocking charges or the like may be provided.

As the conductive base material, known materials can be used.

Specific examples thereof include a plate, a drum or a sheet composed of aluminum, nickel, chromium, palladium, titanium, molybdenum, indium, gold, platinum, silver, copper, zinc, brass, stainless steel, lead oxide, tin oxide, indium oxide, ITO (indium tin oxide: tin doped indium oxide) or graphite; a film, a sheet or a seemless belt of glass, cloth, paper or plastic for which a conductive treatment is conducted by applying these metals or compounds by deposition, sputtering or coating and a metal drum obtained by conducting a metal oxidization treatment such as electrode oxidation.

The charge-generating layer at least comprises a charge-generating material.

The charge-generating layer can be produced by forming a layer of a charge-generating material on an underlying conductive base or charge-transporting layer by the vacuum deposition method, the sputtering method or the like or by forming a layer obtained by binding of a charge-generating material by using a binder resin.

As the method for forming a charge-generating layer using a binder resin, various methods including known methods can be used. For example, a method in which a coating liquid obtained by dispersing or dissolving a charge-generating material in an appropriate solvent together with a binder resin is applied to a substrate serving as a specific undercoat, followed by drying to obtain a wet formed product is preferable.

Various charge-generating materials including known materials can be used.

Specific examples thereof include a serenium simple body such as amorphous serenium and trigonal serenium, serenium alloys such as a serenium-tellurium alloy, a serenium compound such as $As_2Se_3$ or a serenium-containing composition, zinc oxide, an inorganic material composed of an element belonging to the group 12 and the group 16 of the periodic table such as CdS—Se, an oxide-based semiconductor such as titanium oxide, a silicon-based material such as amorphous silicon, a non-metallic phthalocyanine pigment such as r type non-metallic phthalocyanine and x type non-metallic phthalocyanine, a metallic phthalocyanine pigment such as α type copper phthalocyanine, β type copper phthalocyanine, γ type copper phthalocyanine, ∈ type copper phthalocyanine, X type copper phthalocyanine, A type titanyl phthalocyanine, B type titanyl phthalocyanine, C type titanyl phthalocyanine, D type titanyl phthalocyanine, E type titanyl phthalocyanine, F type titanyl phthalocyanine, G type titanyl phthalocyanine, H type titanyl phthalocyanine, K type titanyl phthalocyanine, L type titanyl phthalocyanine, M type titanyl phthalocyanine, N type titanyl phthalocyanine, Y type titanyl phthalocyanine, oxo-titanyl phthalocyanine, titanyl phthalocyanine that shows a strong diffraction peak at a bragg angle 2θ of 27.3±0.2° in the X-ray diffraction diagram, gallium phthalocyanine or the like, cyanine dye, anthracene pigment, bisazo pigment, pyrene pigment, polycyclic quinone pigment, quinacridone pigment, indigo pigment, perylene pigment, pyrylium dye, squarylium pigment, anthoanthron pigment, benzimidazole pigment, azo pigment, thioindigo pigment, quinoline pigment, lake pigment, oxazine pigment, dioxazine pigment, triphenylmethane pigment, azulenium dye, triarylmethane dye, xanthin dye, thiazine dye, thiapyrylium dye, polyvinyl carbazole and bisbenzoimidazole pigment.

Among these charge-generating materials, those specifically described in JP-A-H11-172003 can preferably be given.

These compounds may be used alone or in combination of two or more.

As the charge-transporting material, known various compounds can be used.

For example, a carbazole compound, indole compound, imidazole compound, oxazole compound, pyrazole compound, oxadiazole compound, pyrazoline compound, thiadiazole compound, aniline compound, hydrazone compound, aromatic amine compound, aliphatic amine compound, stilbene compound, fluorenone compound, butadiene compound, quinone compound, quinodimentane compound, thiazole compound, triazole compound, imidazolone compound, imidazolidine compound, bisimidazolidine compound, oxazolone compound, benzothiazole compound, benzimidazole compound, quinazoline compound, benzofurane compound, acridine compound, phenazine compound, poly-N-vinylcarbazole, polyvinyl pyrene, polyvinyl anthracene, polyvinyl acridine, poly-9-vinylphenylanthracene, pyrene-formaldehyde resin, ethylcarbazole resin or a polymer having these structures in a main chain or a side chain can be preferably used.

These compounds may be used alone or in combination of two or more.

Among these charge-transporting materials, those specifically described in JP-A-H11-172003 and charge-transporting materials represented by the following structures can preferably be used.

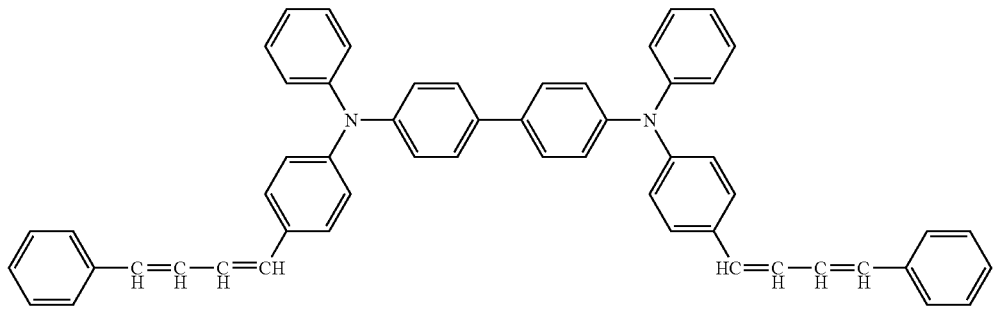

-continued
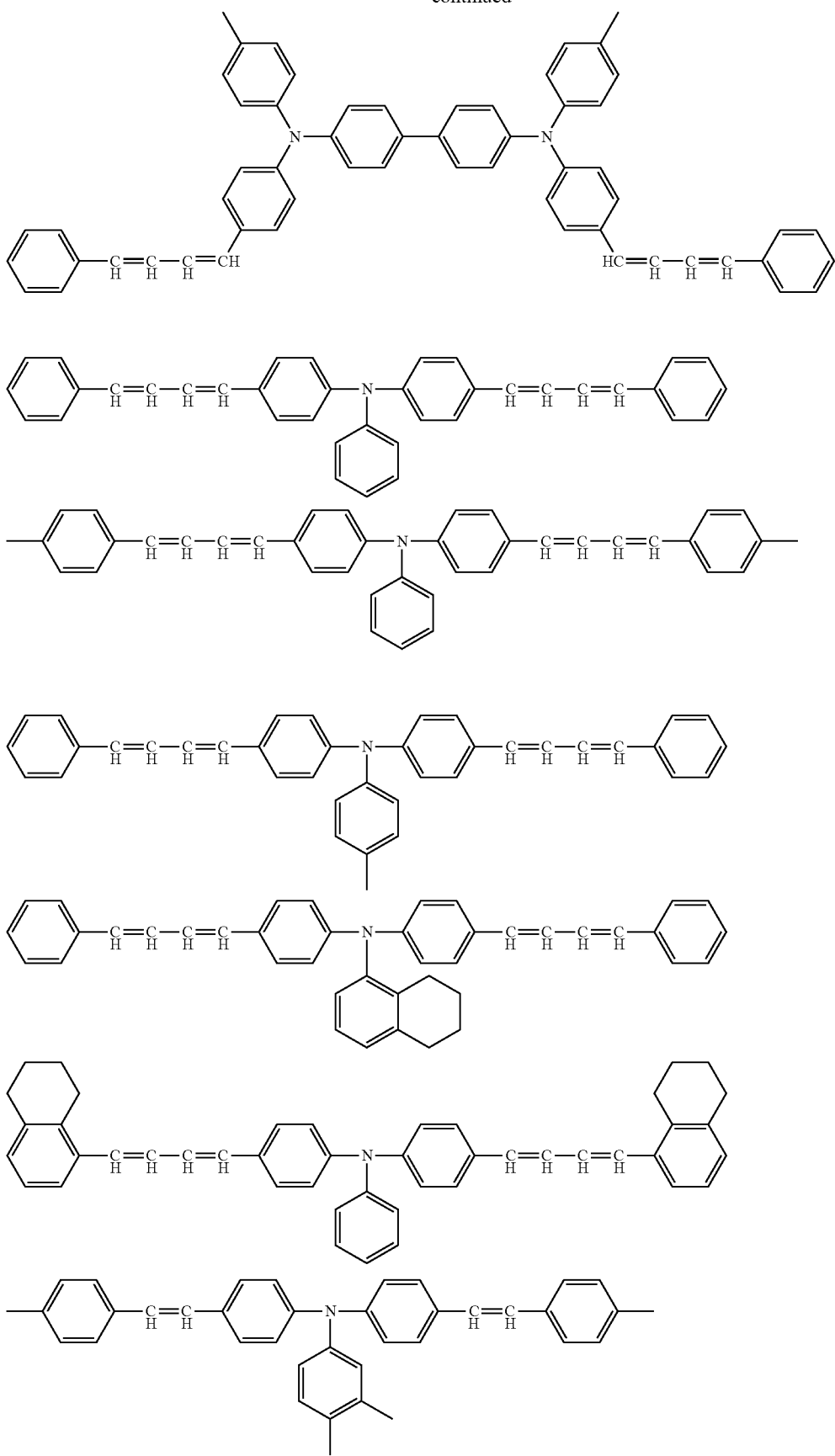

-continued
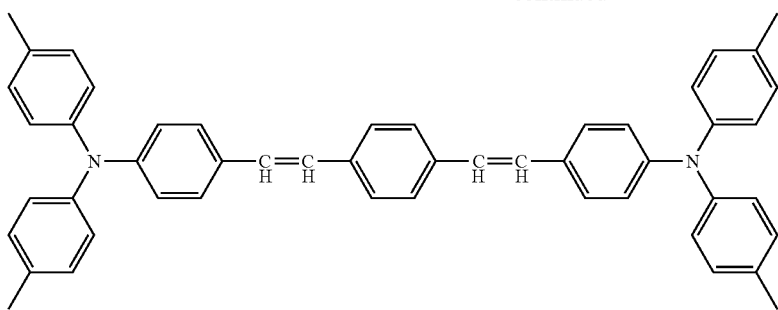
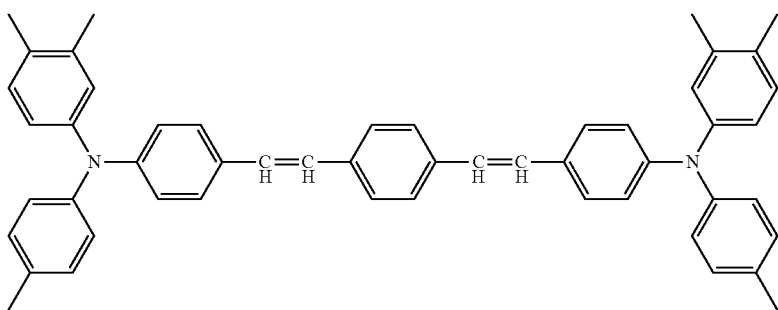
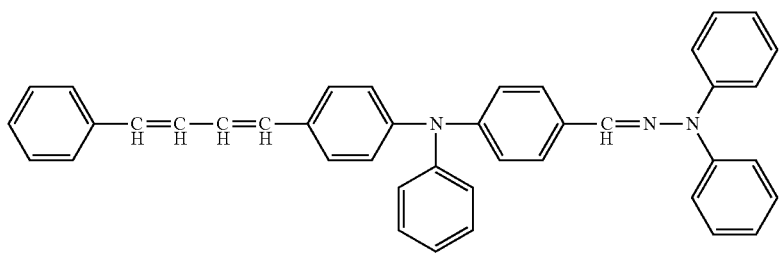
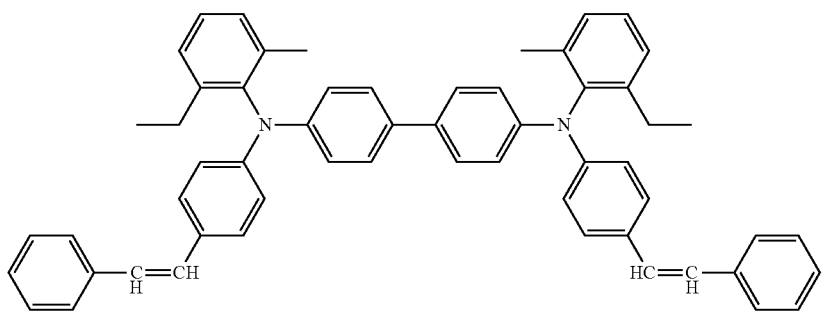
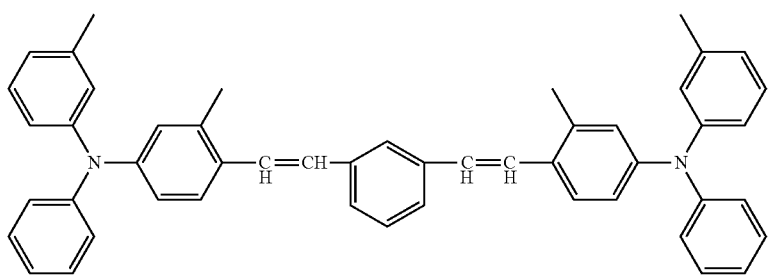

-continued
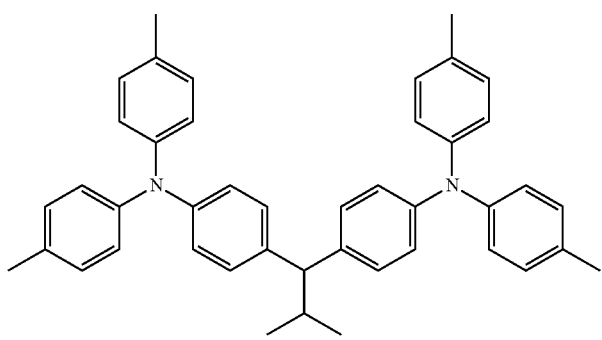
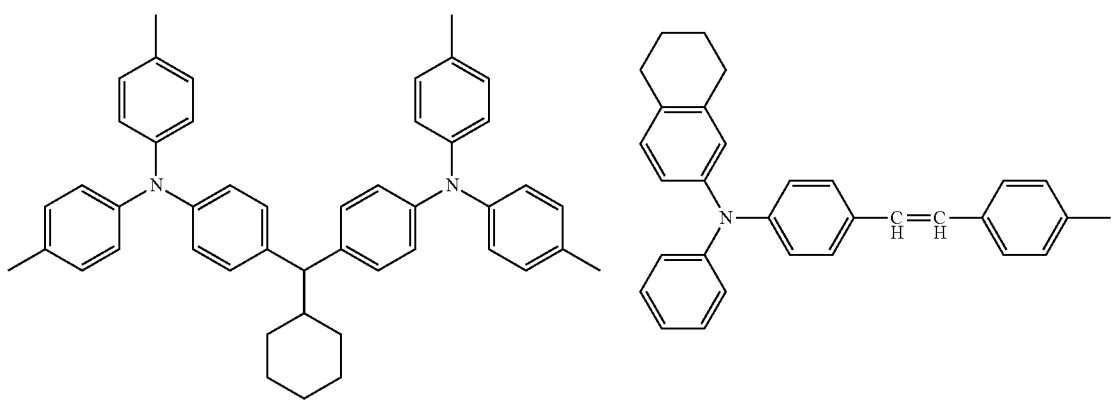
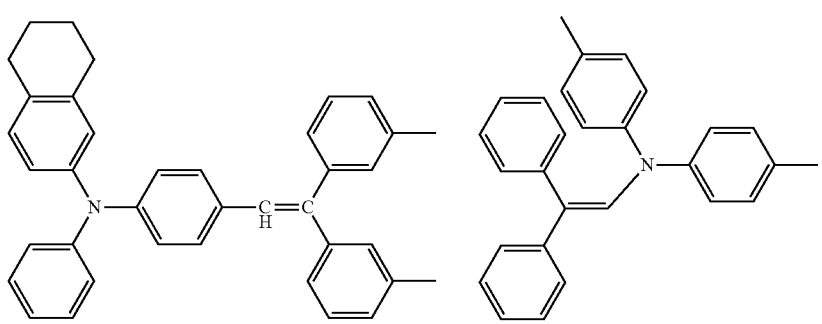
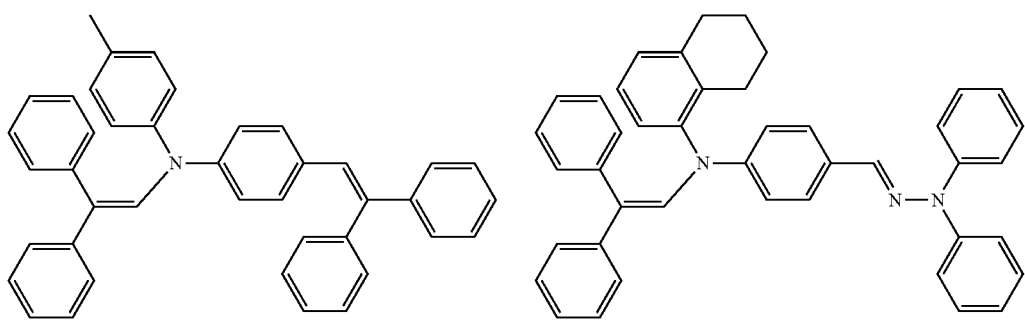
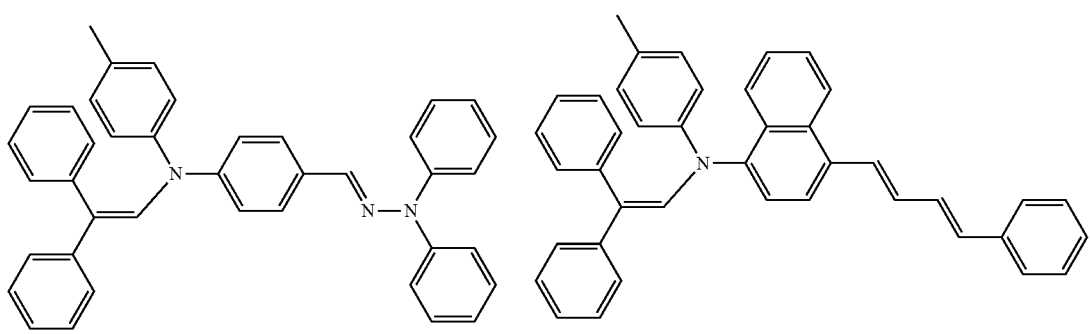

-continued
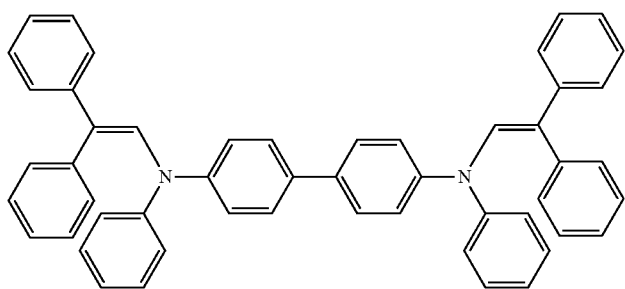
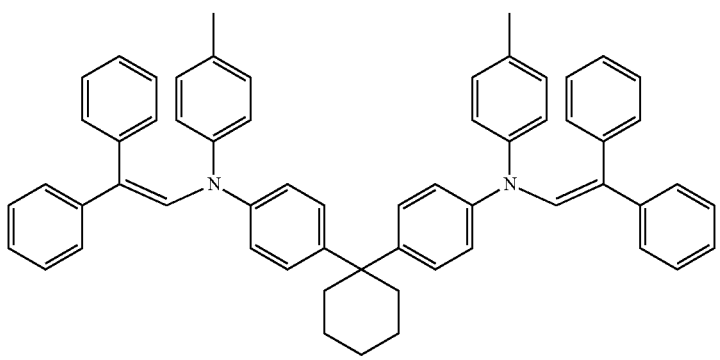
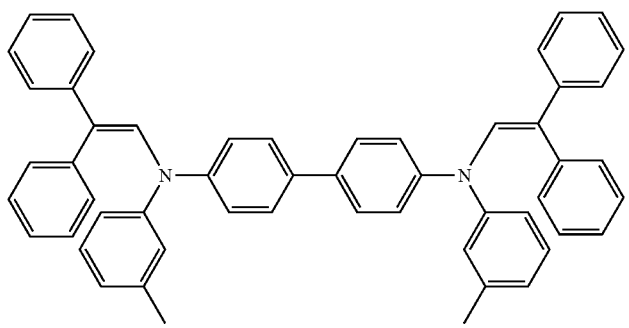
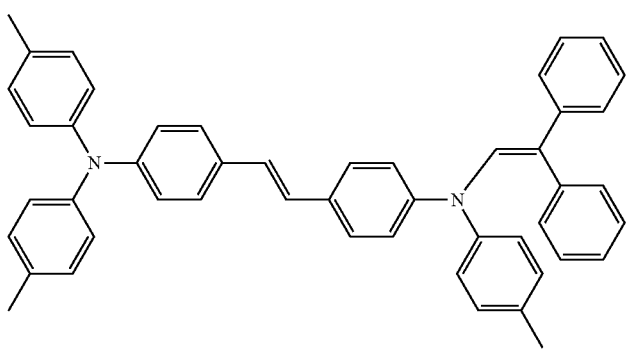
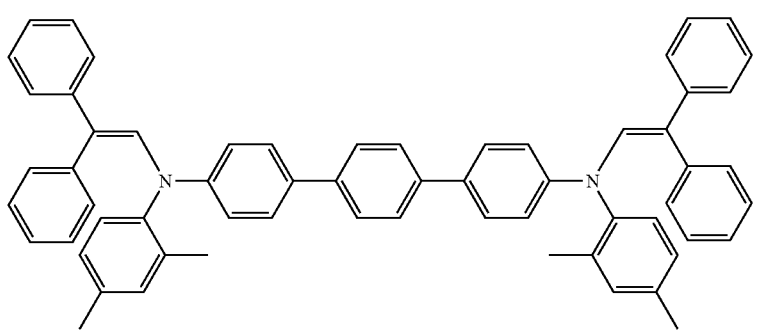

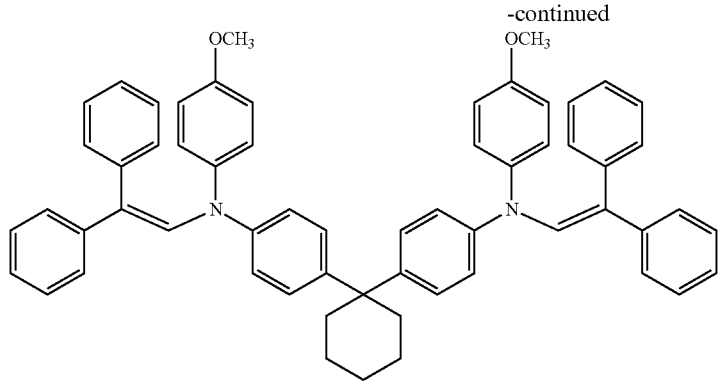
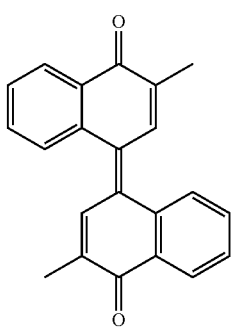
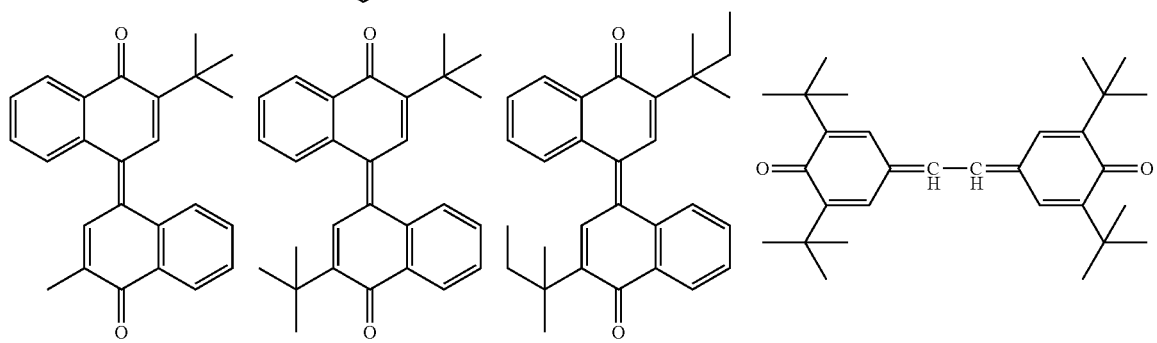
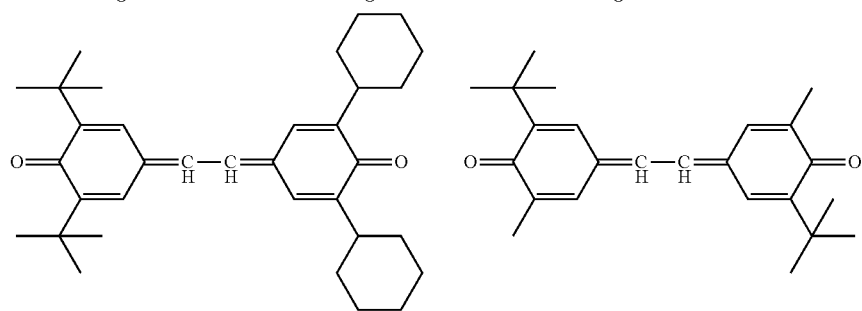
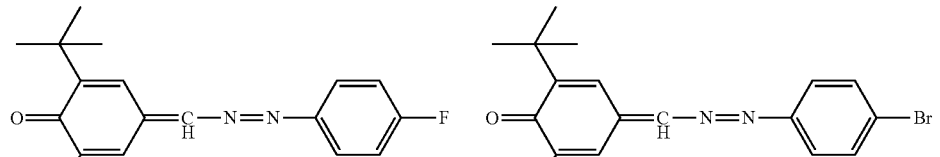
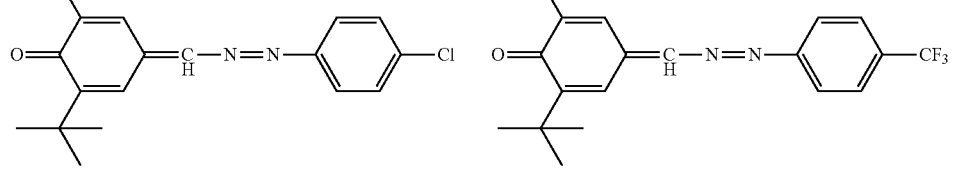
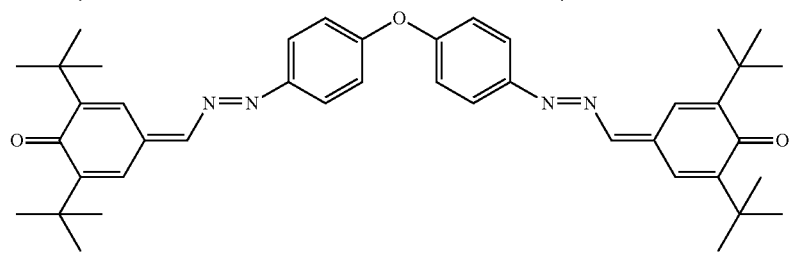

-continued

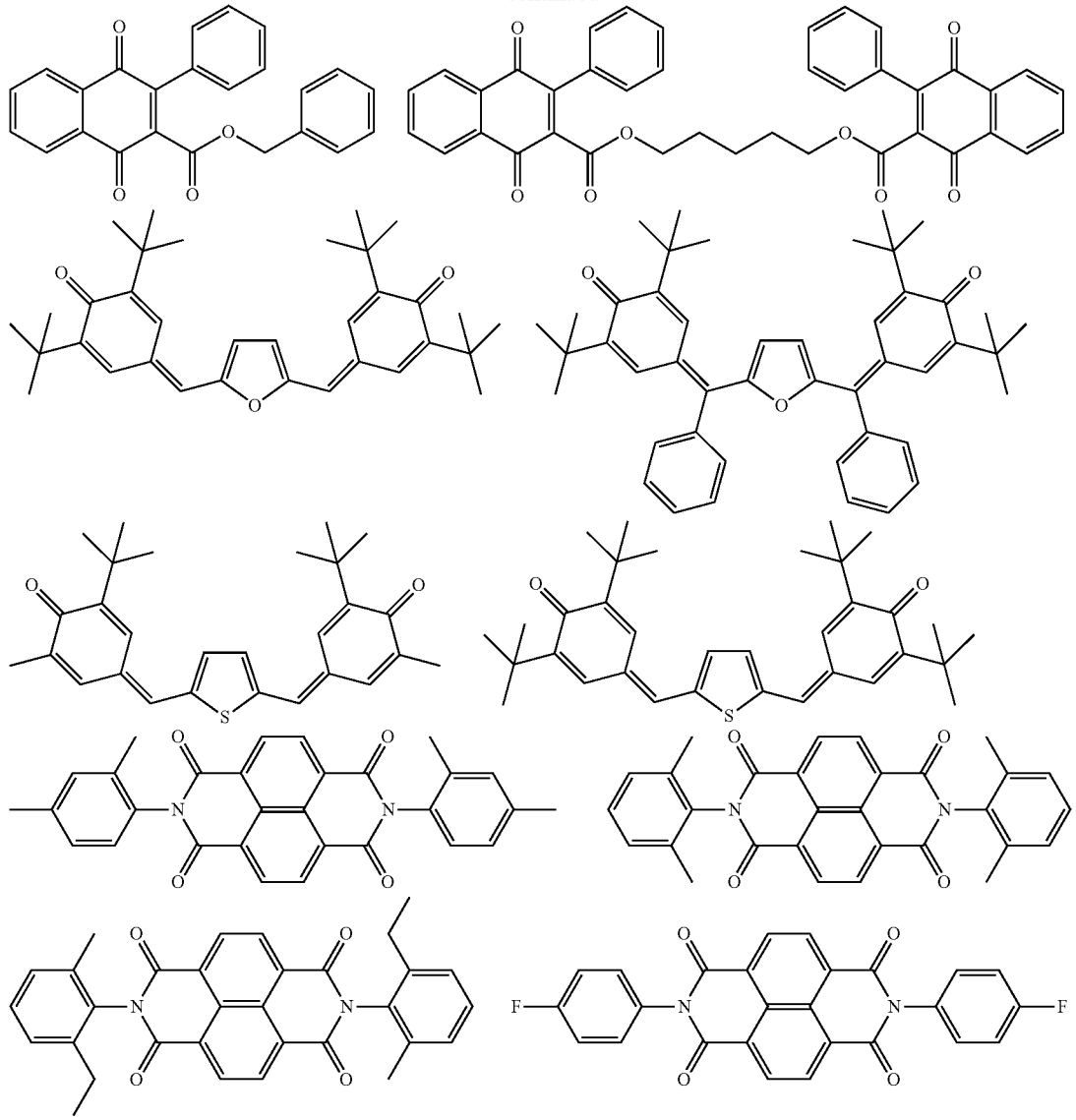

Although known various methods can be used as the method for forming the charge-transporting layer, preferable is a method in which a coating liquid obtained by dispersing or dissolving a charge-transporting material in an adequate solvent together of the PC copolymer of the invention is applied to a conductive base serving as an undercoat, followed by drying, and the charge-transporting material is then bound by using a binder resin to form a wet formed body.

The mixing ratio of the charge-transporting material used in the charge-transporting layer and the PC copolymer is preferably 20:80 to 80:20, further preferably 30:70 to 70:30.

In the charge-transporting layer, the PC copolymer of the invention may be used alone or in combination of two or more. Further, in a range that does not impair the object of the invention, other binder resins may be used in combination with the PC copolymer of the invention.

The thickness of the charge-transporting layer is normally 5 μm or more and 100 μm or less, preferably 10 μm or more and 30 μm or less. If the thickness is less than 5 μm, the initial potential may be lowered. If the thickness is more than 100 μm, the electrophotographic properties may be lowered.

No specific restrictions are imposed on the binder resin, and various known resins can be used.

Specific examples include polystyrene, polyvinyl chloride, polyvinyl acetate, polyvinyl chloride-vinyl acetate copolymer, polyvinyl acetal, alkyd resin, acrylic resin, polyacrylonitrile, polycarbonate, polyurethane, epoxy resin, phenol resin, polyamide, polyketone, polyacrylamide, butyral resin, polyester resin, vinylidene chloride-vinyl chloride copolymer, methacrylic resin, styrene-butadiene copolymer, vinylidene chloride-acrylonitrile copolymer, vinyl chloride-vinyl acetate-maleic anhydride copolymer, silicone resin, silicone-alkyd resin, phenol formaldehyde resin, styrene-alkyd resin, melamine resin, polyether resin, benzoguanamine resin, epoxy acrylate resin, urethane acrylate resin, poly-N-vinyl carbazole, polyvinyl butyral, polyvinyl formal, polysulfone, casein, gelatin, polyvinyl alcohol, ethyl cellulose, nitrocellulose, carboxy-methyl cellulose, vinylidene chloride-based polymer latex, acrylonitrile-butadiene copolymer, vinyl toluene-styrene copolymer, soy bean oil-modified alkyd resin, nitrated polystyrene, polymethylstyrene, polyisoprene, polythiocarbonate, polyarylate, polyhaloarylate, polyacryl ether, polyvinyl acrylate and polyester acrylate.

These can be used alone or in a combination of two or more.

As the binder resin in the charge-generating layer or the charge-transporting layer, the PC copolymer of the invention is preferable.

In the electrophotographic photoreceptor of the invention, it is preferred that at least one of the charge-generating layer and the charge-transporting layer contain the PC copolymer of the invention as the binder resin.

In the electrophotographic photoreceptor of the invention, between the conductive base and the photosensitive layer, a commonly used undercoat layer can be provided.

In the undercoat layer, fine particles of titanium oxide, aluminum oxide, zirconia, titanic acid, zirconic acid, lead lantanate, titanium black, silica, lead titanate, barium titanate, tin oxide, indium oxide and silicon oxide or the like, polyamide resin, phenol resin, casein, melamin resin, benzoguanamine resin, polyurethane resin, epoxy resin, cellulose, nitrocellulose, polyvinyl alcohol, polyvinyl butyral resin or the like can be used.

As the resin used as the undercoat layer, the binder resins mentioned above may be used or the PC copolymer of the invention may be used. These fine particles or resins may be used alone or in a combination of two or more.

If used as a mixture, combination of inorganic fine particles and the resin is preferable since a film having a smooth surface is formed.

The thickness of the undercoat layer is normally 0.01 µm or more and 10 µm or less, preferably 0.1 µm or more and 7 µm or less. If the thickness is less than 0.01 µm, it is difficult to form an undercoat layer uniformly. If the thickness exceeds 10 µm, electrophotographic properties may be lowered.

Between the conductive base and the photosensitive layer, a known blocking layer that is commonly used can be used.

As the blocking layer, the same kind of resin as that of the above-mentioned binder resins can be used. The PC copolymer of the invention may be used.

The thickness of the blocking layer is preferably 0.01 µm or more and 20 µm or less, preferably 0.1 µm or more and 10 µm or less. If the thickness is less than 0.01 µm, it is difficult to form a blocking layer uniformly, and if the thickness exceeds 20 µm, electrophotographic properties may be lowered.

Further, in the electrophotographic photoreceptor of the invention, on the photosensitive layer, a protective layer may be stacked. In this protective layer, the same kinds of the resin as those of the binder resins mentioned above can be used. It is particularly preferable to use the PC copolymer of the invention. The thickness of the protective layer is normally 0.01 µm or more and 20 µm or less, preferably 0.1 µm or more and 10 µm or less. This protective layer may contain the charge-generating material, the charge-transporting material, an additive, a metal or oxides, nitrides, salts and alloys thereof, carbon black, conductive materials such as an organic conductive compound, a fluorine resin such as Teflon (registered trademark), a lubricity-imparting material such as a silicone resin or the like.

Further, in order to improve the electrophotographic photoreceptor, in the charge-generating layer and the charge-transporting layer mentioned above, a binder, a plasticizer, a curing catalyst, a fluidity imparting agent, a pinhole control agent, a spectral sensitizer (sensitizing dye) may be added.

In order to prevent an increase in residual potential, a lowering in charge potential and a lowering in sensitivity that occur by repeated use, various chemical substances, additives such as antioxidants, surfactants, curling preventing agents, leveling agent or the like may be added.

As the binding agent, a silicone resin, a polyamide resin, a polyurethane resin, polyester resin, epoxy resin, polyketone resin, polycarbonate resin, polystyrene resin, polymethacrylate resin, polyacrylamide resin, polybutadiene resin, polyisoprene resin, melamine resin, benzoguanamine resin, polychloroprene resin, polyacrylonitrile resin, ethylcellulose resin, nitrocellulose resin, urea resin, phenol resin, phenoxy resin, polyvinyl butyral resin, formal resin, vinyl acetate resin, vinyl acetate/vinyl chloride copolymer resin and polyester carbonate resin or the like can be given.

In addition, a heat and/or a light curable resin can be used No specific restrictions are imposed on these resins as long as they are electrically insulating, capable of forming a coating film in the normal state and does not impair the effects of the invention.

As the plasticizer, biphenyl, biphenyl chloride, o-terphenyl, halogenated paraffin, dimethyl naphthalene, dimethyl phthalate, dibutyl phthalate, dioctyl naphthalate, diethylene glycol phthalate, triphenyl phosphate, diisobutyl adipate, dimethyl sebacate, dibutyl sebacate, butyl laurate, methyl phthalyl ethyl glycolate, dimethyl glycol phthalate, methyl naphthalene, benzophenone, polypropylene, polystyrene, fluorohydrocarbon or the like can be given.

As the curing catalyst, methane sulfonic acid, dodecyl benzene sulfonic acid, dinonyl naphthalene disulfonic acid or the like can be given. As the fluidity-imparting agent, Modaflow, Acronal 4F or the like can be given. As the pinhole controlling agent, benzoin, dimethyl phthalate or the like can be given. It is preferred that these plasticizers, curing catalysts, fluidity imparting agents, pinhole controlling agents or the like be used in an amount of 5 mass % or less relative to the amount of the charge-transporting material.

As the spectral sensitizer, for example, triphenyl methane-based dyes such as methyl violet, crystal violet, night blue, and Victoria blue; acridine, dyes such as erythrosine, rhodamine B, rhodamine 3R, acridine orange and flapeosine; thiazine dyes such as methylene blue and methylene green; oxadine dyes such as capri blue and Meldola's blue; cyanine dyes, mellocyanine dyes, styryl dyes, pyrylium salt dyes, thiopyrylium salt dyes or the like are suitable.

In the photosensitive layer, in order to improve the sensitivity, decrease the residual potential, reduce the fatigue when used repeatedly, or for other purposes, an electron-receptive material may be added.

As specific examples, preferable are compounds having large electron affinity such as succinic anhydride, maleic anhydride, dibromo maleic anhydride, phthalic anhydride, tetrachlorophthalic anhydride, tetrabromophthalic anhydride, 3-nitrophthalic anhydride, 4-nitrophthalic anhydride, pyromellitic dianhydride, mellitic anhydride, tetracyanoethylene, tetracyanoquinodimethane, o-dinitrobenzene, m-dinitrobenzene, 1,3,5-trinitrobenzene, p-nitrobenzonitrile, pycryl chloride, quinone chloromide, chloranil, bromanil, benzoquinone, 2,3-dichlorobenzoquinone, dichlorodicyanoparabenzoquinone, naphthoquinone, diphenoquinone, tropoquinone, anthraquinon, 1-chloroanthraquinone, dinitroanthraquinone, 4-nitrobenzophenone, 4,4'-dinitrobenzophenone, 4-nitrobenzyl malonodinitrile, α-cyano-β-(p-cyanophenyl)ethyl acrylate, 9-anthracenylmethylmalonic dinitrile, 1-cyano-(p-nitrophenyl)-2-(p-chlorophenyl)ethylene, 2,7-dinitrofluorenone, 2,4,7-trinitrofluorenone, 2,4,5,7-tetranitrofluorenone, 9-fluorenylidene-(dicyanomethylene malononitrile), polynitro-9-fluorenylidene-(dicyanomethylene malonodinitrile), picric acid, o-nitrobenzoic acid, p-nitrobenzoic acid, 3,5-dinitrobenzoic acid, pentafluorobenzoic acid, 5-nitrosalicylic acid, 3,5-dinitro salicylic acid, phthalic acid and mellitic acid.

These compounds may be added to any one of the charge-generating layer and the charge-transporting layer, and the amount thereof is normally 0.01 part by mass or more and 200 parts by mass or less, preferably 0.1 part by mass or more and 50 parts by mass or less relative to 100 parts by mass of the amount of the charge-generating material or the charge-transporting material.

In order to improve the surface properties, surface modifiers such as polytetrafluoroethylene, polytrifluoroethylene, fluorinated ethylene-propylene copolymer, polyvinyl fluoride, polyvinylidene fluoride, polyethylene chloride difluoride and a copolymer thereof, a fluorine-based graft polymer or the like may be used.

The mixing ratio of the surface modifier is normally 0.1 mass % or more and 60 mass % or less, and preferably 5 mass % or more and 40 mass % or less relative to the above-mentioned binder resin. If the mixing ratio is smaller than 0.1 mass %, surface modification is not sufficient, causing lowering in surface durability and surface energy. If the mixing ratio is larger than 60 mass %, lowering in electrophotographic properties may be caused.

As the antioxidant, hindered phenol-based antioxidants, aromatic amine-based antioxidants, hindered amine-based antioxidants, sulfide-based antioxidants, organic phosphoric acid-based antioxidants or the like are preferable. The mixing ratio of the anti-oxidants is normally 0.01 mass % or more and 10 mass % or less, preferably 0.1 mass % or more and 2 mass % or less relative to the charge-transporting material.

As specific examples of the antioxidants, compounds represented by the formulas (94) to (101) of JP-A-H11-172003 are preferable.

Antioxidants may be used alone or in a mixture of two or more. Antioxidants may be used not only in the photosensitive layer but also in a surface-protective layer, an undercoat layer or a blocking layer.

As specific examples of the solvent used in the formation of the charge-generating layer and the charge-transporting layer, an aromatic solvent such as benzene, toluene, xylene and chlorobenzene; a ketone such as acetone, methyl ethyl ketone and cyclohexanone; an alcohol such as methanol, ethanol and isopropanol; esters such as ethyl acetate and ethyl cellosolve; halogenated hydrocarbons such as carbon tetrachloride, carbon tetrabromide, chloroform, dichloromethane and tetrachloroethane; ethers such as tetrahydrofuran, dioxolane and dioxane; dimethylformamide, dimethylsulfoxide, and diethylformamide, or the like can be given.

These solvents may be used alone or in combination of two or more.

The photosensitive layer of a single-layer type electrophotographic photoreceptor can be formed easily by applying the binder resin (PC copolymer) of the invention by using the charge-generating material, the charge-transporting material, and if need arises, by using an additive.

As the charge-transporting material, it is preferred that the hole-transporting material and/or the electron-transporting material be added. As the electron-transporting material, those exemplified in JP-A-2005-139339 are preferable.

Each layer can be formed by means of various coating apparatuses including known apparatuses. Specifically, each layer can be formed by means of an applicator, a spray coater, a bar coater, a chip coater, a roll coater, a dip coater, a doctor blade or the like.

The thickness of the photosensitive layer in the electrophotographic photoreceptor is normally 5 µm or more and 100 µm or less, preferably 8 µm or more and 50 µm or less. If the thickness is less than 5 µm, the initial potential may become low easily. A thickness larger than 100 µm may result in lowering in electrographic properties.

The ratio of the charge-generating material and the binder resin used for producing the electrophotographic photoreceptor is normally 1:99 to 30:70, preferably 3:97 to 15:85, in terms of mass ratio. The ratio of the charge-transporting material and the binder resin is normally 10:90 to 80:20, preferably 30:70 to 70:30, in terms of mass ratio.

The electrophotographic photoreceptor of the invention obtained by the above-mentioned method does not suffer turbidity or gelation of the coating liquid when the photosensitive layer is produced. Further, since the photosensitive layer comprises a formed product (binder resin) containing the PC copolymer of the invention, the electrophotographic photoreceptor has excellent durability (wear resistance) and has excellent electric properties (static properties), and hence, maintains excellent electrophotographic properties for a long period of time. Therefore, it can be preferably used in various electrophotographic fields such as a copier (monochromatic, multi-color, full-color, analogue, digital), a printer (laser, LED, liquid crystal shutter), facsimile, a plate-making apparatus and an apparatus having a plurality of these functions.

When the electrophotographic photoreceptor of the invention is used, for charging, corona discharge (corotron, scorotron), contact charging (charging roll, charging brush) or the like are used. As the charging roll, a DC charging type roll or a DC charging type roll in which AC charging is overlapped can be given.

For exposure, any of a halogen lamp, a fluorescent lamp, laser (semiconductor laser, He—Ne laser), LED and an internal photoreceptor exposure may be used. As for development, a dry development method or a wet development method such as cascade development, dual component magnetic brush development, dielectric single component toner development, single component conductive toner development or the like can be given.

For the transfer, the electrostatic transfer method such as corona transfer, roller transfer or belt transfer, the pressure transfer method, or the adhesive transfer method is used. For the fixing, heat roller fixing, radiant flash fixing, open fixing, pressure fixing or the like is used.

For the cleaning and neutralizing, a brush cleaner, a magnetic brush cleaner, an electrostatic brush cleaner, a magnetic roller cleaner, a blade cleaner, and those having no cleaner are used.

As the resin for toner, a styrene resin, a styrene-acrylic copolymer resin, polyester, an epoxy resin, a polymer of cyclic hydrocarbons or the like can be applied. The tonner may be in a spherical shape, unshaped, or even in a specific shape (spheroidal, similar to a potato, for example). The toner may be a pulverized, suspension polymerized, emulsion polymerized, chemical granulated, or ester elongation polymerized toner.

EXAMPLES

Next, the invention will be explained in more detail with reference to Examples and Comparative Examples, but the invention is not limited to these examples, and various modifications and applications are possible in these examples without materially departing from the scope of the invention.

Production Example 1

Synthesis of Bisphenol-Z Oligomer (Bischloroformate)

56.6 kg (224 mol) of 1,1-bis(4-hydroxyphenyl)cyclohexane(bisphenol-Z) was suspended in 1080 L of methylene chloride and was dissolved by adding 66.0 kg (667 mol) of phosgene to the resulting suspension. Thereto, the solution obtained by dissolving 44.0 kg (435 mol) of triethylamine in 120 L of methylene chloride was added dropwise at 2.2 to 17.8° C. for 2 hours and 50 minutes. After the resulting solution was stirred at 17.9 to 19.6° C. for 30 minutes, 900 L of methylene chloride was distilled off at 14 to 20° C. The remaining solution was cleaned by adding 210 L of pure water, 1.2 kg of concentrated hydrochloric acid and 450 g of hydrosulfite.

After that, cleaning with 210 L of pure water was repeated five times to obtain a methylene chloride solution (Z—CF) of biphenol Z oligomer having a chloroformate group at the molecular terminal.

The concentration of chloroformate in the solution obtained was 1.14 mol/L, the concentration of solid matter was 0.22 kg/L and the average number of monomers was 1.02.

The average number of monomers (n') was determined by using the following formula.

$$n' = 1 + (Mav - M1)/M2 \quad (A)$$

In the formula (A), May is (2×1000/(CF value)), CF value (N/kg) is (CF number/concentration), CF number (N) is a chlorine molecule number of the bischloroformate compound contained in a 1 L reaction solution, and the concentration (kg/L) is an amount of a solid resulting from condensation of the 1 L reaction solution.

M1 is a molecular weight of the bischloroformate compound when n'=1, and M2 is (M1-98.92). "98.92" is a total atomic weight of two chlorine atoms, one oxygen atom and one carbon atom that are desorbed by polycondensation of bishcloroformate compounds.

Production Example 2

Synthesis of Bisphenol CZ Oligomer (Bischloroformate)

To a mixture of 266 g (0.897 mol) of 1,1-bis(3-methyl-4-hydroxyphenyl)cyclohexane (bisphenol CZ), 1058 ml of methylene chloride and 187 g (1.89 mol) of phosgene, a solution obtained by diluting 199.4 g (1.97 mol) of triethylamine with 460 ml of methylene chloride was added dropwise at 13 to 16° C. for 3 hours and 6 minutes. The reaction mixture was stirred at 14 to 16° C. for one hour and 38 minutes. The reaction mixture was cleaned by adding 5.0 ml of concentrated hydrochloric acid and 200 ml of pure water. After that, cleaning with water was repeated until the water phase became neutral to obtain a methylene chloride solution (CZ—CF) of a bisphenol CZ oligomer having a chloroformate group at the molecular terminal.

The concentration of chloroformate in the solution obtained was 1.01 mol/L, the concentration of solid matter was 0.22 kg/L and the average number of monomers was 1.10.

Production Example 3

Synthesis of Bisphenol FCZ Oligomer (Bischlorofonnate)

To a mixture of 250 g (0.595 mol) of 1,1-bis(3-trifluoromethyl-4-hydroxyphenyl)cyclohexane(bisphenol FCZ), 1020 ml of methylene chloride and 187 g (1.89 mol) of phosgene, a solution obtained by diluting 199.4 g (1.97 mol) of triethylamine with 460 ml of methylene chloride was added dropwise at 13 to 16° C. for 3 hours and 6 minutes. The reaction mixture was stirred at 14 to 16° C. for one hour and 38 minutes. The reaction mixture was cleaned by adding 5.0 ml of concentrated hydrochloric acid and 200 ml of pure water. After that, cleaning with water was repeated until the water phase became neutral to obtain a methylene chloride solution (FCZ—CF) of a bisphenol FCZ oligomer having a chloroformate group at the molecular terminal.

The concentration of chloroformate in the solution obtained was 1.04 mol/L, the concentration of solid matter was 0.23 kg/L and the average number of monomers was 1.05.

Production Example 4

Synthesis of Bisphenol EZ Oligomer (Bischloroformate)

To a mixture of 256 g (0.821 mol) of 1,1-bis(3-ethyl-4-hydroxyphenyl)cyclohexane(bisphenol EZ), 1058 ml of methylene chloride and 187 g (1.89 mol) of phosgene, a solution obtained by diluting 199.4 g (1.97 mol) of triethylamine with 460 ml of methylene chloride was added dropwise at 13 to 16° C. for 3 hours and 6 minutes. The reaction mixture was stirred at 14 to 16° C. for one hour and 38 minutes. The reaction mixture was cleaned by adding 5.0 ml of concentrated hydrochloric acid and 200 ml of pure water. After that, cleaning with water was repeated until the water phase became neutral to obtain a methylene chloride solution (EZ-CF) of a bisphenol EZ oligomer having a chloroformate group at the molecular terminal.

The concentration of chloroformate in the solution obtained was 1.10 mol/L, the concentration of solid matter was 0.24 kg/L and the average number of monomers was 1.01.

Production Example 5

Synthesis of DMCP Oligomer (Bischloroformate)

76.7 kg (0.272 mol) of 1,1-bis(3-methyl-4-hydroxyphenyl)cyclopentane(DMCP) was suspended in 410 mL of methylene chloride and was dissolved by adding 53.8 g (0.533 mol) of triethylamine to the resulting suspension. This solution was added dropwise to a solution obtained by dissolving 52.7 g (0.533 mol) of phosgene in 225 mL of methylene chloride at 14 to 18.5° C. for 2 hours and 50 minutes. After the resulting solution was stirred at 18.5 to 19° C. for one hours, 250 mL of methylene chloride was distilled off at 10 to 22° C. The remaining solution was cleaned by adding 73 mL of pure water, 4.5 mL of concentrated hydrochloric acid and 0.47 g of hydrosulfite. After that, cleaning with 330 mL of pure water was repeated four times to obtain a methylene chloride solution (DMCP-CF) of a DMCP oligomer having a chloroformate group at the molecular terminal.

The concentration of chloroformate in the solution obtained was 0.89 mol/L, the concentration of solid matters was 0.20 kg/L and the average number of monomers (n') was 1.14.

Production Example 6

Synthesis of OC-B Oligomer (Bischloroformate)

To a mixture of 266.0 g (0.984 mol) of 2,2-bis(3-methyl-4-hydroxyphenyl)butane(OC-B), 1058 ml of methylene chloride and 187 g (1.89 mol) of phosgene, a solution obtained by diluting 199.4 g (1.97 mol) of triethylamine with 460 ml of methylene chloride was added dropwise at 13 to 16° C. for 3 hours and 6 minutes. The reaction mixture was stirred at 14 to 16° C. for one hour and 38 minutes. The reaction mixture was cleaned by adding 5.0 ml of concentrated hydrochloric acid and 200 ml of pure water. After that, cleaning with water was repeated until the water phase became neutral to obtain a methylene chloride solution (OCB-CF) of an OC-B oligomer having a chloroformate group at the molecular terminal.

The concentration of chloroformate in the solution obtained was 1.02 mol/L, the concentration of solid matters was 0.21 kg/L and the average number of monomers was 1.15. Hereinafter, the raw material obtained is referred to as OCB-CF.

Production Example 7

Synthesis of OC-E Oligomer (Bischloroformate)

To a mixture of 182.0 g (0.751 mol) of 1,1-bis(3-methyl-4-hydroxyphenyl)ethane (OC-E), 1058 ml of methylene chloride and 187 g (1.89 mol) of phosgene, a solution obtained by diluting 199.4 g (1.97 mol) of triethylamine with 460 ml of methylene chloride was added dropwise at 13 to 16° C. for 3 hours and 6 minutes. The reaction mixture was stirred at 14 to 16° C. for one hour and 38 minutes. The reaction mixture was cleaned by adding 5.0 ml of concentrated hydrochloric acid and 200 ml of pure water. After that, cleaning with water was repeated until the water phase became neutral to obtain a methylene chloride solution of a bisphenol OC-E oligomer having a chloroformate group at the molecular terminal.

The concentration of chloroformate in the solution obtained was 1.10 mol/L, the concentration of solid matter was 0.20 kg/L and the average number of monomer was 1.09. Hereinafter, the raw material obtained is referred to as OCE-CE Production Example 8

Synthesis of Bisphenol CZ Oligomer

While a solution obtained by dissolving 0.2 kg of 1,1-bis(3-methyl-4-hydroxyphenyl)cyclohexane in 1.2 kg of a 16% by mass aqueous solution of potassium hydroxide and 1.3 kg of methylene chloride were mixed and stirred, phosgene gas was blown into the resulting mixture at the rate of 1 L/minute in a cooled state until the pH thereof became to 9 or less. Subsequently, the reaction liquid was allowed to stand for separation to obtain, in an organic phase, a methylene chloride solution of an oligomer with a degree of polymerization of 2 to 6 having a chloroformate group at the molecular terminal (mol concentration of chloroformate=0.5 mol/L, concentration of solid matter=0.26 kg/L).

The concentration of chloroformate in the solution obtained was 0.5 mol/L, the concentration of solid matters was 0.26 kg/L and the average number of monomers was 3.13. Hereinafter, the raw material obtained is referred to as PCO-CZ.

Example 1

Production of PC Copolymer

CZ-CF (166 mL) in Production Example 2 and methylene chloride (245 mL) were poured into a reactor provided with a mechanical stirrer, a stirring blade and a baffle. Thereto, as a chain end terminator, p-tert-butylphenol (PTBP) (0.253 g) was added. The resulting mixture was stirred so as to be well mixed. After cooling until the temperature inside the reactor reached to 15° C., a total amount of 4,4'-biphenol solution which had prepared separately was added to the solution. To the resulting mixture, 2.0 mL of an aqueous solution of triethylamine (7 vol %) was added while stirring. The stirring was further continued for one hour.

The method for preparing a 4,4'-biphenol solution was as follows: 140 mL of a 1.5N aqueous solution of sodium hydroxide (sodium hydroxide 10.1 g) was prepared. After cooling the solution to be below room temperature, 0.1 g of hydrosulfite as an antioxidant and 15.26 g of 4,4'-biphenol were added to the solution and allowed to be fully dissolved to obtain a solution.

The reaction mixture obtained was diluted with 0.2 L of methylene chloride and 0.1 L of water, followed by cleaning. After the lower layer was separated, cleaning was conducted as follows: once with 0.1 L of water, once with 0.1 L of 0.03N hydrochloric acid, and three times with 0.1 L of water in this order. The resulting methylene chloride solution was added dropwise to methanol while stirring. The redeposit matter obtained was subjected to filtration and drying to obtain a PC copolymer (PC-1).

[Identification of PC Copolymer (PC-1)]

The PC copolymer (PC-1) was dissolved in methylene chloride to prepare a solution with a concentration of 0.5 g/dl. For the solution obtained, the reduction viscosity [$\eta$sp/C] at 20° C. was measured by means of an Ubbelohde-type capillary viscometer. The measured result was 1.13 dl/g.

Also, the structure and composition of PC-1 were analyzed by $^1$H-NMR spectrum and $^{13}$C-NMR spectrum. As a result, it was confirmed that PC-1 was a PC copolymer that has the following repeating unit with a repeating unit number (n) of 1.38, and a copolymerization molar ratio ($Ar^2/(Ar^1+Ar^2)$) of 0.42.

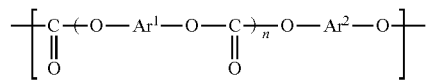

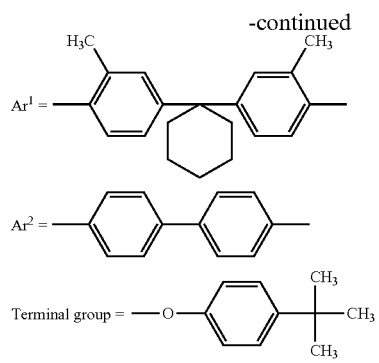

The structure of PC-1 was confirmed according to the following procedure. Firstly, no presence of the bonding of $Ar^2$s was checked by using $^{13}C$-NMR spectrum. Next, the copolymerization ratios of $Ar^1$ and $Ar^2$ (a, b) were calculated by $^1H$-NMR spectrum. Then, n was calculated based on the following formula (B).

$$a=Ar^1/(Ar^1+Ar^2)=0.58$$

$$b=Ar^2/(Ar^1+Ar^2)=0.42$$

$$Ar^2/(Ar^1+Ar^2)=1/(n+1) \quad (B)$$

[Production of Coating Liquid and Electrophotographic Photoreceptor]

As a conductive base, a polyethylene terephthalate resin film on which aluminum had been deposited was used. On the surface of the film, a charge-generating layer and a charge-transporting layer were stacked sequentially to form a stacked-type photosensitive layer, whereby an electrophotographic photoreceptor was produced.

As a charge-generating substance, 0.5 parts by mass of oxo-titanium phthalocyanine was used and as a binder resin, 0.5 parts by mass of a butyral resin was used. These was added to 19 parts by mass of methylene chloride as a solvent and dispersed by means of a ball mill. The resulting dispersion liquid was applied to the surface of the conductive base film by a bar coater and then dried to form a charge-generating layer having a film thickness of about 0.5 μm.

Next, as a charge-transporting substance, 0.5 g of the following compound (CTM-1) and 0.5 g of the polycarbonate copolymer (PC-1) obtained above were dispersed in 10 mL of tetrahydrofuran to prepare a coating liquid. The coating liquid was applied on the charge-generating layer by an applicator and then dried to form a charge-transporting layer having a thickness of about 20 μm.

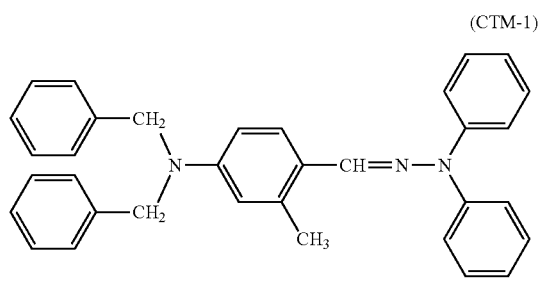 [SMILES: Cc1cc(N(Cc2ccccc2)Cc2ccccc2)ccc1C=NN(c1ccccc1)c1ccccc1]

(CTM-1)

The produced PC copolymer and the produced electrophotographic photoreceptor were evaluated as follows. The results are shown in Table 1.

[Evaluation of Viscosity Coefficient of PC Copolymer]

The viscosity coefficient of PC copolymer was evaluated as follows.

[1] Preparation of a Solution of a Copolymer

PC-1 (3 g) and tetrahydrofuran (27 g) were added to a mighty vial and stirred for 10 hours. The vial was allowed to stand overnight to obtain a solution for evaluation.

[2] Evaluation

The viscosity coefficient of the solution for evaluation produced in [1] was evaluated using a rotational viscometer "Alpha" (manufactured by Viscotech Co., Ltd.). The test was conducted under the following conditions: measurement temperature; 20° C., number of rotations; 50 rpm. The value was measured after the lapse of 3 minutes from the start of the measurement.

[Evaluation of Wear resistance of PC copolymer and Electrophotographic Photoreceptor]

The wear resistance of the PC copolymer and the electrophotographic photoreceptor was evaluated as follows.

[1] Preparation of Sample for Wear resistance Evaluation of Copolymer

PC-1 (2 g) was dissolved in methylene chloride (12 mL). The resulting solution was applied on a commercial PET film using an applicator to form a cast film. This film was heated under reduced pressure to remove the solvent, whereby a film sample having a thickness of about 30 μm was obtained.

[2] Preparation of Sample for Wear resistance Evaluation of Photoreceptor

PC-1 (1 g) and CTM-1 (0.67 g) mentioned above were dissolved in methylene chloride (10 mL). The resulting solution was applied on a commercial PET film using an applicator to form a cast film. This film was heated under reduced pressure to remove the solvent, whereby a film sample having a thickness of about 30 μm was obtained.

[3] Evaluation

The wear resistance of the casted surfaces of the films prepared in [1] and [2] was evaluated using a taber abrasion tester (manufactured by Toyo Seiki Seisaku-Sho, Ltd.). As the test conditions, a wear ring (model number: CS-10) under 500 g loads was contacted to the surface of a film and the wear ring was rotated at 1,000 turns in the case of (1), or at 500 turns in the case of (2). After rotation, the mass reduction was measured.

[Evaluation of Hardness of PC Copolymer and Electrophotographic Photoreceptor]

The hardness of the PC copolymer and the electrophotographic photoreceptor was evaluated as follows.

[1] Preparation of Sample for Wear Resistance Evaluation of Copolymer

PC-1(1 g) was dissolved in methylene chloride (9 mL). The resulting solution was poured into a petri dish (diameter: 100) uniformly and dried at normal temperature and normal humidity (K152) overnight. Then, heating was conducted under reduced pressure to remove the solvent to obtain a cast sample with a thickness of about 70 μm.

[2] Preparation of Sample for Wear Resistance Evaluation of Photoreceptor

PC-1(1 g) and CTM-1 (0.67 g) mentioned above were dissolved in methylene chloride (10 mL). The resulting solution was poured into a petri dish (diameter: 100) uniformly and dried at normal temperature and normal humidity (K152) overnight. Then, heating was conducted under reduced pressure to remove the solvent to obtain a cast sample with a thickness of about 70 μm.

[3] Evaluation

The surface hardness of the cast samples produced in [1] and [2] was evaluated by using a Vickers hardness meter M'VK-EIII (manufactured by AKASHI). In the test, a diamond indenter under 10 g loads was pressed, and the hardness was evaluated from the size of the resulting indentation.

[Evaluation of Electrophotographic Characteristics of Electrophotographic Photoreceptor]

Next, the resulting electrophotographic photoreceptor was measured for the electrophotographic characteristics using an electrostatic charge testing machine EPA-8100 (manufactured by Kawaguchi Electric Works.).

A corona discharge of −6 kV was conducted in a static mode to measure an initial surface potential ($V_0$), a residual potential (initial residual potential ($V_R$)) 5 seconds after light irradiation (10 Lux), and a half decay exposure ($E_{1/2}$) were measured.

In addition, a commercial printer (FS-600, produced by KYOCERA Corporation) was re-modeled so as to enable it to conduct the measurement of the surface potential of a photoreceptor. The photoreceptor was mounted on a drum to enable the evaluation. Under high temperatures and high humidities (35° C., 85%), the operation without using any toner and any paper was conducted repeatedly for 24 hours. The charging characteristics before and after the operation (an increase in residual potential by repeated ($V_R$ increase)) were evaluated.

In Example 1, an oligomer composed of a small number of monomers of bisphenol CZ, which has excellent mechanical characters (wear resistance, hardness) in general, was reacted with a biphenyl monomer having an excellent wear resistance in a specific method, whereby a resin having a copolymerization ratio (%) of bisphenol CZ to biphenyl of 58:42 could be obtained. It was confirmed that the electrophotographic photoreceptor suffered less mechanical deterioration.

Example 2

A PC copolymer (PC-2) was obtained in the same manner as in Example 1, except that FCZ-CF (158 mL) in Production Example 3 was used instead of CZ-CF, and the amount of methylene chloride was changed to 240 mL, and the amount of PTBP was changed to 0.243 g.

The reduction viscosity [ηsp/C] of PC-2 was 1.10 dl/g.

Also, the structure and composition of PC-2 was determined in the same manner as in Example 1. It was confirmed that PC-2 was a PC copolymer having the following repeating unit with a number (n) of the repeating units of 1.44, and a copolymerization molar ratio $Ar^2/(Ar^1+Ar^2)$ of 0.41.

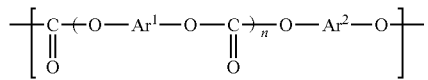

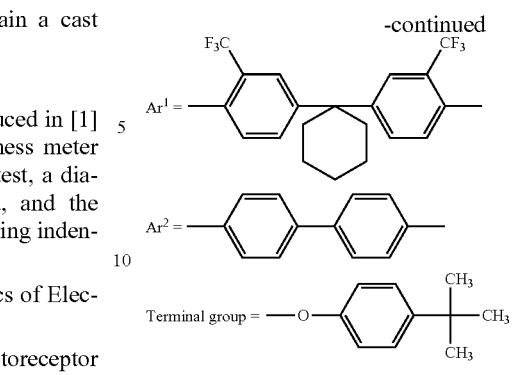

a = $Ar^1/(Ar^1 + Ar^2)$ = 0.59
b = $Ar^2/(Ar^1 + Ar^2)$ = 0.41

Moreover, a coating liquid and an electrophotographic photoreceptor were produced and evaluated in the same manner as in Example 1. The results are shown in Table 1.

Example 3

A PC copolymer (PC-3) was obtained in the same manner as in Example 1, except that EZ-CF (149 mL) in Production Example 4 was used instead of CZ-CF, and the amount of methylene chloride was changed to 250 mL, and the amount of PTBP was changed to 0.247 g.

The reduction viscosity [ηsp/C] of PC-3 was 1.15 dl/g.

Also, the structure and composition of PC-3 was determined in the same manner as in Example 1. It was confirmed that PC-3 was a PC copolymer having the following repeating unit with a number (n) of the repeating units of 1.56, and a copolymerization molar ratio $Ar^2/(Ar^1+Ar^2)$ of 0.39.

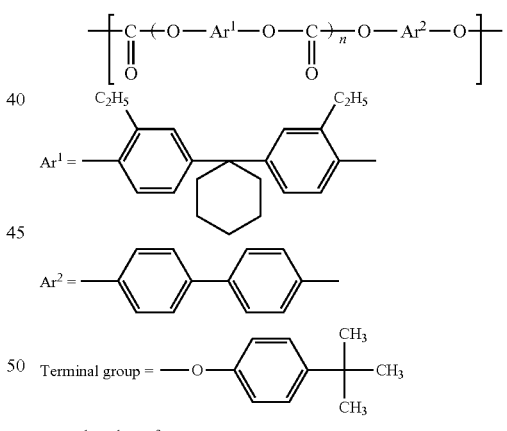

a = $Ar^1/(Ar^1 + Ar^2)$ = 0.61
b = $Ar^2/(Ar^1 + Ar^2)$ = 0.39

Moreover, a coating liquid and an electrophotographic photoreceptor were produced and evaluated in the same manner as in Example 1. The results are shown in Table 1.

Example 4

CZ-CF (166 mL) in Production Example 2 and methylene chloride (245 mL) was poured into a reactor provided with a mechanical stirrer, a stirring blade and a baffle. As a chain end terminator, PTBT (0.264 g) was added thereto and the mixture was stirred to be in a well-mixed state. After cooling until the temperature inside the reactor reached 15° C., a total amount of a solution of 3,3'-dimethyl-4,4'-biphenol prepared separately was added thereto. 2.0 mL of an aqueous solution of triethylamine (7 vol %) was added thereto while stirring. Further stirring was continued for one hour.

The solution of 3,3'-dimethyl-4,4'-biphenol was prepared as follows: 140 mL of a 1.5 N aqueous solution of sodium hydroxide (sodium hydroxide: 10.1 g) was prepared and cooled below room temperature. Then, 0.1 g of hydro sulfite as an antioxidant and 17.41 g of 3,3'-dimethyl-4,4'-biphenol were added and dissolved completely to prepare the solution.

The reactant obtained was cleaned in the same manner as in Example 1 to obtain PC copolymer (PC-4).

The reduction viscosity [ηsp/C] of PC-4 was 1.12 dl/g.

Also, the structure and composition of PC-4 was determined in the same manner as in Example 1. It was confirmed that PC-4 was a PC copolymer having the following repeating unit with a number (n) of the repeating units of 1.44 and a copolymerization molar ratio $Ar^2/(Ar^1+Ar^2)$ of 0.41.

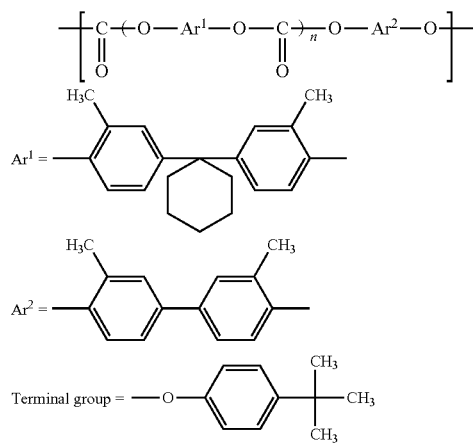

$a = Ar^1/(Ar^1 + Ar^2) = 0.59$
$b = Ar^2/(Ar^1 + Ar^2) = 0.41$

Moreover, a coating liquid and an electrophotographic photoreceptor were produced and evaluated in the same manner as in Example 1. The results are shown in Table 1.

Example 5

A PC copolymer (PC-5) was obtained in the same manner as in Example 1, except that 0.850 g of fluorinated diethylene glycol monohexyl ether (also known as 2,2-difluoro-2-(2-perfluorohexyloxyethoxy) ethanol) was used instead of 0.243 g of PTBP.

The reduction viscosity [ηsp/C] of PC-5 was 1.14 dl/g.

Also, the structure and composition of PC-5 were determined in the same manner as in Example 1. It was confirmed that PC-5 was a PC copolymer having following repeating unit with a number (n) of the repeating units of 1.44 and a copolymerization molar ratio $Ar^2/(Ar^1+Ar^2)$ of 0.41.

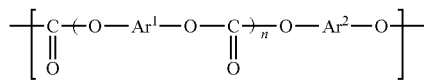

-continued

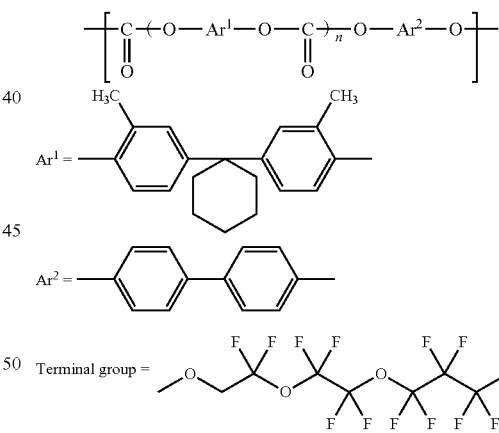

$a = Ar^1/(Ar^1 + Ar^2) = 0.59$
$b = Ar^2/(Ar^1 + Ar^2) = 0.41$

Moreover, a coating liquid and an electrophotographic photoreceptor were produced and evaluated in the same manner as in Example 1. The results are shown in Table 1.

Example 6

A PC copolymer (PC-6) was obtained in the same manner as in Example 1, except that 0.694 g of 2,2-difluoro-2-(1,1,2,2-tetrafluoro-2-(perfluorobutoxy)ethoxy) ethanol was used instead of 0.243 g of PTBP.

The reduction viscosity [lisp/C] of PC-6 was 1.12 dl/g.

Also, the structure and composition of PC-6 were determined in the same manner as in Example 1. It was confirmed that PC-6 was a PC copolymer having the following repeating unit with a number (n) of the repeating units of 1.44 and a copolymerization molar ratio $Ar^2/(Ar^1+Ar^2)$ of 0.41.

Moreover, a coating liquid and an electrophotographic photoreceptor were produced and evaluated in the same manner as in Example 1. The results are shown in Table 1.

Example 7

A PC copolymer (PC-7) was obtained in the same manner as in Example 1, except that 0.682 g of 2,2-difluoro-2-(perfluorohexyloxy)ethanol was used instead of 0.243 g of PTBP.

The reduction viscosity [ηsp/C] of PC-7 was 1.15 dl/g.

Also, the structure and composition of PC-7 were determined in the same manner as in Example 1. It was confirmed that PC-7 was a PC copolymer having the following repeating unit with a number (n) of the repeating units of 1.44 and a copolymerization molar ratio $Ar^2/(Ar^1+Ar^2)$ of 0.41.

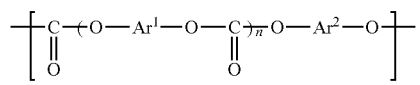

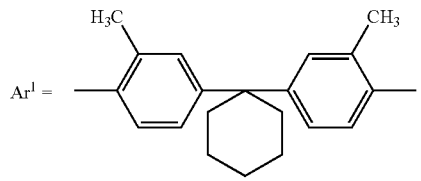

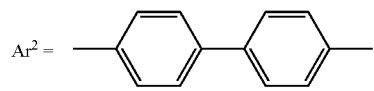

Terminal group =

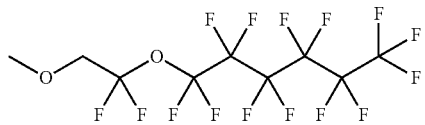

a = $Ar^1/(Ar^1 + Ar^2)$ = 0.59
b = $Ar^2/(Ar^1 + Ar^2)$ = 0.41

Moreover, a coating liquid and an electrophotographic photoreceptor were produced and evaluated in the same manner as in Example 1. The results are shown in Table 1.

Example 8

DMCP-CF (18 mL) in Production Example 5 and methylene chloride (42 mL) were poured into a reactor provided with a mechanical stirrer, a stirring blade and a baffle. As a chain end terminator, PTBT (0.03 g) was added thereto and the mixture was stirred to be in a well-mixed state. To the resulting solution, a total amount of a solution of an aromatic dihydric phenol monomer prepared separately was added. After cooling until the temperature inside the reactor reach 15° C., 0.2 mL of an aqueous solution of triethylamine (7 vol %) was added thereto while stirring. The stirring was further continued for one hour.

The solution of aromatic dihydric phenol monomer was prepared as follows: 10 mL of a 2N aqueous solution of sodium hydroxide was prepared and cooled below room temperature. Then, 0.1 g of hydrosulfite as an antioxidant and 1.4 g of 4,4'-biphenol were added and dissolved completely to prepare the solution.

The reactant obtained was cleaned in the same manner as in Example 1 to obtain PC copolymer (PC-8).

The reduction viscosity [ηsp/C] of PC-8 was 1.17 dl/g.

Also, the structure and composition of PC-8 were determined in the same manner as in Example 1. It was confirmed that PC-8 was a PC copolymer having the following repeating unit with a number (n) of the repeating units of 1.93 and a copolymerization molar ratio $Ar^2/(Ar^1+Ar^2)$ of 0.34.

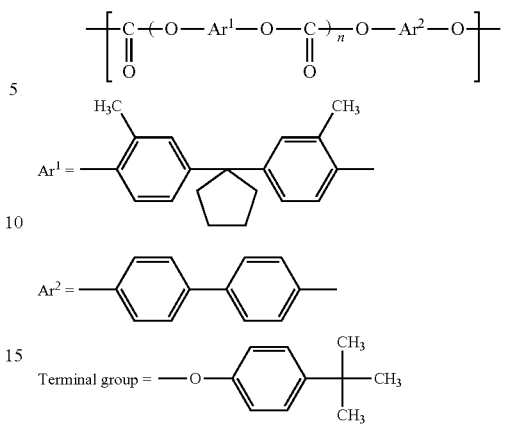

a = $Ar^1/(Ar^1 + Ar^2)$ = 0.66
b = $Ar^2/(Ar^1 + Ar^2)$ = 0.34

Moreover, a coating liquid and an electrophotographic photoreceptor were produced and evaluated in the same manner as in Example 1. The results are shown in Table 1.

Example 9

OCB-CF (256 mL) in Production Example 6 and methylene chloride (383 mL) were poured into a reactor provided with a mechanical stirrer, a stirring blade and a baffle. As a chain end terminator, PTBT (0.433 g) was added thereto and the mixture was stirred to be in a well-mixed state. To the resulting solution, a total amount of a solution of an aromatic dihydric phenol monomer prepared separately was added. After cooling until the temperature inside the reactor reach 15° C., 2.0 mL of an aqueous solution of triethylamine (7 vol %) were added thereto while stirring. The stirring was continued for further one hour.

The solution of aromatic dihydric phenol monomer was prepared as follows: 215 mL of a 2 N aqueous solution of sodium hydroxide was prepared and cooled below room temperature. Then, 0.2 g of hydrosulfite as an antioxidant and 24.2 g of 4,4'-biphenol was added and dissolved completely to prepare the solution.

The reactant obtained was cleaned in the same manner as in Example 1 to obtain PC copolymer (PC-9).

The reduction viscosity [ηsp/C] of PC-9 was 1.21 dl/g.

Also, the structure and composition of PC-9 were determined in the same manner as in Example 1. It was confirmed that PC-9 was a PC copolymer having the following repeating unit with a number (n) of the repeating units of 1.44 and a copolymerization molar ratio $Ar^2/(Ar^1+Ar^2)$ of 0.41.

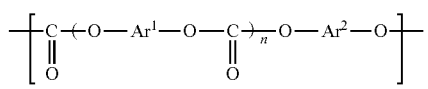

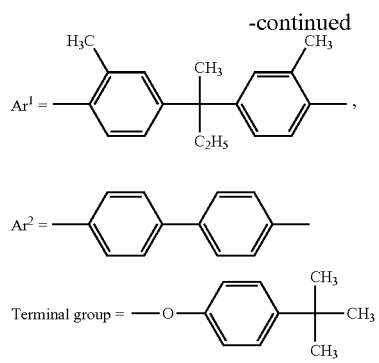

a = Ar¹/(Ar¹ + Ar²) = 0.59
b = Ar²/(Ar¹ + Ar²) = 0.41

Example 10

OCE-CF (256 mL) in Production Example 7 and methylene chloride (383 mL) were poured into a reactor provided with a mechanical stirrer, a stirring blade and a baffle. As a chain end terminator, PTBT (0.4323 g) was added thereto and the mixture was stirred to be in a well-mixed state. To the resulting solution, a total amount of a solution of an aromatic dihydric phenol monomer prepared separately was added. After cooling until the temperature inside the reactor reached 15° C., 2.0 mL of an aqueous solution of triethylamine (7 vol %) were added thereto while stirring. The stirring was continued for further one hour.

The solution of aromatic dihydric phenol monomer was prepared as follows: 215 mL of a 2 N aqueous solution of sodium hydroxide was prepared and cooled below room temperature. Then, 0.2 g of hydrosulfite as an antioxidant and 26.2 g of 4,4'-biphenol was added and dissolved completely to prepare the solution.

The reactant obtained was cleaned in the same manner as in Example 1 to obtain PC copolymer (PC-10).

The reduction viscosity [ηsp/C] of PC-10 was 1.19 dl/g.

Also, the structure and composition of PC-10 were determined in the same manner as in Example 1. It was confirmed that PC-10 was a PC copolymer having the following repeating unit with a number (n) of the repeating units of 1.38 and a copolymerization molar ratio Ar²/(Ar¹+Ar²) of 0.42.

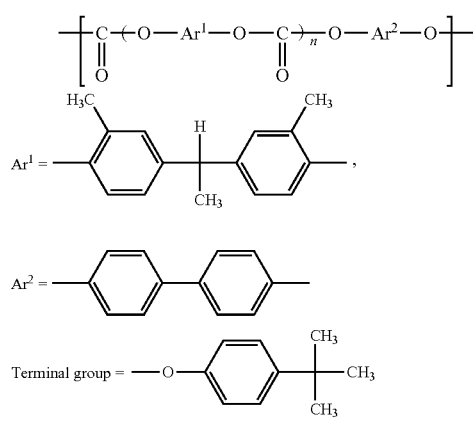

a = Ar¹/(Ar¹ + Ar²) = 0.58
b = Ar²/(Ar¹ + Ar²) = 0.42

Comparative Example 1

CZ-CF (34 mL) in Production Example 2 and methylene chloride (26 mL) were poured into a reactor provided with a mechanical stirrer, a stirring blade and a baffle. As a chain end terminator, PTBT (0.03 g) was added thereto and the mixture was stirred to be in a well-mixed state. To the resulting solution, a total amount of a solution of an aromatic dihydric phenol monomer prepared separately was added. After cooling until the temperature in the reactor reached 15° C., 0.2 mL of an aqueous solution of triethylamine (7 vol %) was added thereto while stirring. The stirring was further continued for one hour.

The solution of aromatic dihydric phenol monomer was prepared as follows: 26 mL of a 2N aqueous solution of sodium hydroxide was prepared and cooled below room temperature. Then, 0.1 g of hydrosulfite as an antioxidant and 1.7 g of resorcin were added and dissolved completely to prepare the solution.

The reactant obtained was cleaned in the same manner as in Example 1 to obtain a PC copolymer (PC-11).

The reduction viscosity [ηsp/C] of PC-11 was 0.53 dl/g.

Also, the structure and composition of PC-11 was determined in the same manner as in Example 1. It was confirmed that PC-11 was a PC copolymer having the following repeating unit with a number (n) of the repeating units of 1.67 and a copolymerization molar ratio Ar²/(Ar¹+Ar²) of 0.37.

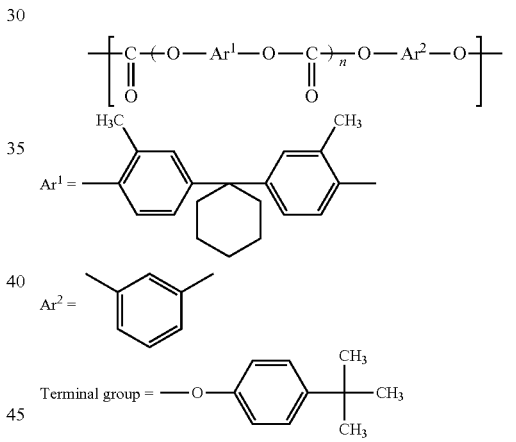

a = Ar¹/(Ar¹ + Ar²) = 0.63
b = Ar²/(Ar¹ + Ar²) = 0.37

Moreover, a coating liquid and an electrophotographic photoreceptor were produced and evaluated in the same manner as in Example 1. The results are shown in Table 1.

Comparative Example 2

Z-CF (157 mL) in Production Example 1 and methylene chloride (227 mL) were poured into a reactor provided with a mechanical stirrer, a stirring blade and a baffle. As a chain end terminator, PTBT (0.336 g) was added thereto and the mixture was stirred to be in a well-mixed state. After cooling until the temperature in the reactor reached 15° C., to the resulting solution, a total amount of a solution of 4,4'-biphenol prepared was added. 0.2 mL of an aqueous solution of triethylamine (7 vol %) was added thereto while stirring. Further stirring was continued for one hour.

The solution of 4,4'-biphenol was prepared as follows: 135 mL of a 1.5 N aqueous solution of sodium hydroxide (sodium hydroxide: 11.1 g) was prepared and cooled below room temperature. Then, 0.1 g of hydrosulfite as an antioxidant and 7.6 g of 4,4'-biphenol were added and dissolved completely to prepare the solution.

The reactant obtained was cleaned in the same manner as in Example 1 to obtain PC copolymer (PC-12).

The reduction viscosity [ηsp/C] of PC-12 was 1.15 Mg.

Also, the structure and composition of PC-12 were determined in the same manner as in Example 1. It was confirmed that PC-12 was a PC copolymer having the following repeating unit with a number (n) of the repeating units of 1.38 and a copolymerization molar ratio $Ar^2/(Ar^1+Ar^2)$ of 0.42.

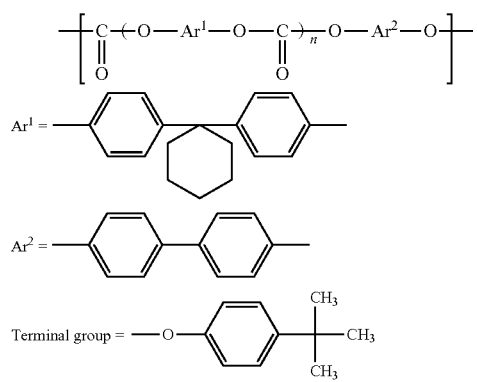

$a = Ar^1/(Ar^1 + Ar^2) = 0.58$
$b = Ar^2/(Ar^1 + Ar^2) = 0.42$

Moreover, a coating liquid and an electrophotographic photoreceptor were produced and evaluated in the same manner as in Example 1. The results are shown in Table 1.

Comparative Example 3

PCO-CZ (256 mL) in Production Example 8 and methylene chloride (250 mL) were poured into a reactor provided with a mechanical stirrer, a stirring blade and a baffle. As a chain end terminator, PTBT (0.423 g) was added thereto and the mixture was stirred to be in a well-mixed state. After cooling until the temperature inside the reactor reached 15° C., to the resulting solution, a total amount of a solution of 4,4'-biphenol prepared was added. 1.4 mL of an aqueous solution of triethylamine (7 vol %) was added thereto while stirring. The stirring was continued for further one hour.

The solution of 4,4'-biphenol was prepared as follows: 170 mL of a 1.4 N aqueous solution of sodium hydroxide (sodium hydroxide: 15.0 g) was prepared and cooled below room temperature. Then, 0.2 g of hydrosulfite as an antioxidant and 9.28 g of 4,4'-biphenol were added and dissolved completely to prepare the solution.

The reactant obtained was cleaned in the same manner as in Example 1 to obtain a PC copolymer (PC-13).

The reduction viscosity [ηsp/C] of PC-13 was 1.16 dl/g.

Also, the structure and composition of PC-13 were determined in the same manner as in Example 1. It was confirmed that PC-13 was a PC copolymer having following repeating unit with a number (n) of the repeating units of 4.56 and a copolymerization molar ratio $Ar^2/(Ar^1+Ar^2)$ of 0.18.

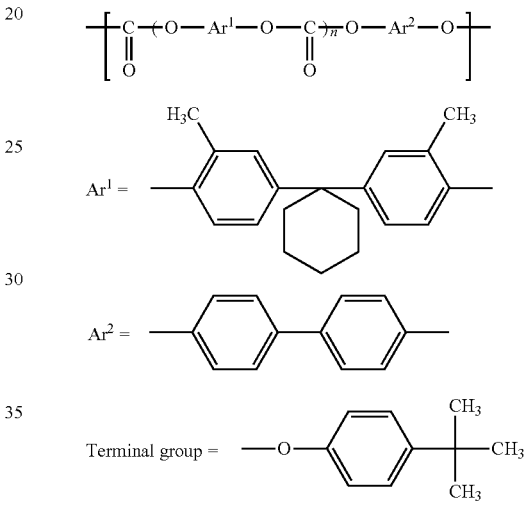

$a = Ar^1/(Ar^1 + Ar^2) = 0.82$
$b = Ar^2/(Ar^1 + Ar^2) = 0.18$

Moreover, a coating liquid and an electrophotographic photoreceptor were produced and evaluated in the same manner as in Example 1. The results are shown in Table 1.

TABLE 1

| | | PC Copolymer | | | | Electrophotographic Photoreceptor | | | |
| | | | | | | Wear | | Initial | Residual |
| | Copolymer | Reduction viscosity (dl/g) | Wear resistance (mg) | Hardness | Viscosity Coefficient (cP) | resistance (mg) | Hardness | Residual Potential $(V_R)(V)$ | Potential when repeated $(V_R$ Increase)(V) |
|---|---|---|---|---|---|---|---|---|---|
| Example 1 | PC-1 | 1.13 | 2.0 | 18.5 | 154 | 6.5 | 25.5 | −10 | 10 |
| Example 2 | PC-2 | 1.10 | 1.5 | 18.2 | 150 | 6.4 | 25.2 | −10 | 10 |
| Example 3 | PC-3 | 1.15 | 2.1 | 18.0 | 167 | 6.7 | 25.1 | −10 | 10 |
| Example 4 | PC-4 | 1.12 | 2.2 | 19.0 | 143 | 6.6 | 26.1 | −10 | 10 |
| Example 5 | PC-5 | 1.14 | 1.9 | 18.1 | 153 | 6.4 | 25.4 | −10 | 10 |
| Example 6 | PC-6 | 1.12 | 2.1 | 18.3 | 152 | 6.6 | 25.6 | −10 | 10 |
| Example 7 | PC-7 | 1.15 | 2.0 | 18.1 | 154 | 6.6 | 25.5 | −10 | 10 |
| Example 8 | PC-8 | 1.17 | 2.1 | 18.5 | 169 | 6.7 | 25.7 | −10 | 10 |
| Example 9 | PC-9 | 1.21 | 1.7 | 17.5 | 175 | 11.8 | 25 | −10 | 10 |
| Example 10 | PC-10 | 1.19 | 1.8 | 18.0 | 180 | 6.5 | 25.8 | −10 | 10 |
| Com. Ex. 1 | PC-11 | 0.53 | 5.2 | 15.8 | — | 6.6 | 24.4 | −20 | 20 |
| Com. Ex. 2 | PC-12 | 1.15 | 2.0 | 15.0 | 280 | 6.5 | 23.9 | −10 | 10 |
| Com. Ex. 3 | PC-13 | 1.16 | 3.7 | 18.2 | 170 | 8.3 | 25.4 | −10 | 10 |

From the results in Examples and Comparative Examples, it was confirmed that PC copolymers in Examples had extremely excellent wear resistance, excellent hardness and low viscosity coefficient. No PC copolymers in Comparative Examples had excellent wear resistance and excellent hardness at the same time. In Comparative Example 2, although the wear resistance was good, the hardness was poor. In Comparative Example 3, although the hardness was excellent, the wear resistance was poor.

INDUSTRIAL APPLICABILITY

The polycarbonate copolymer of the invention can be suitably used in a binder resin for a photosensitive layer of an electrophotographic photoreceptor, and in a resin for coating of various rolls and drums or films.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the Japanese patent applications claiming the priority under the Paris Convention to the invention are incorporated herein by reference in its entirety.

The invention claimed is:

1. A polycarbonate copolymer comprising a repeating unit represented by the following formula (1) and having a copolymerization molar ratio represented by $Ar^2/(Ar^1+Ar^2)$ of 38 mol % or more and 47 mol % or less,

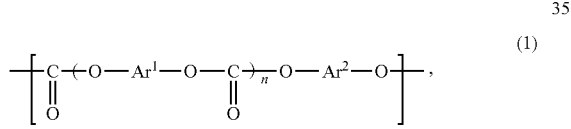
(1)

wherein in the formula (1), $Ar^1$ is a group represented by the following formula (2a) and $Ar^2$ is a group represented by the following formula (3); and n is an average number of repetition and is 1.12 or more and 2.34 or less;

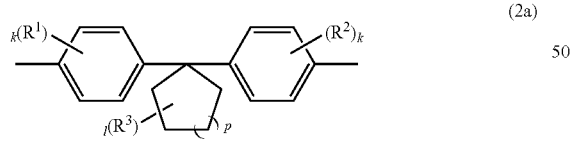
(2a)

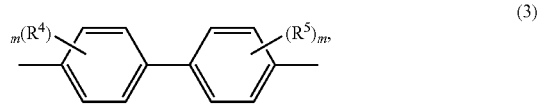
(3)

wherein in the formula (2a), $R^1$ to $R^3$ are independently an alkyl group including 1 to 10 carbon atoms; and in the formulas (2a) and (3), k is 1, m is 0, 1 is 0 and p is 2, and wherein the chain end is a group represented by $C(R)_3$—$(CF_2)n^{35}$-O—$(CF_2CF_2O)n^{34}$-$CF_2CH_2$—O—, wherein $n^{34}$ is an integer of 1 to 3, $n^{35}$ is an integer of 1 to 5, and R is $CF_3$ or F.

2. The polycarbonate copolymer according to claim 1, wherein the chain end is a group represented by any of the following formulas:

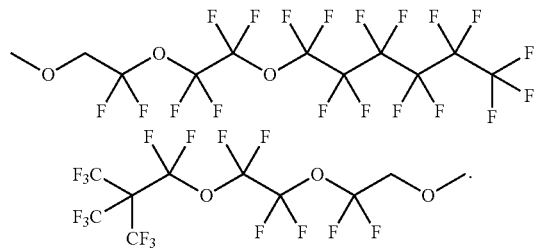

3. The polycarbonate copolymer according to claim 1, wherein the reduction viscosity [ηsp/C] of a methylene chloride solution of the polycarbonate copolymer having a concentration of 0.5 g/dl at a temperature of 20° C. is 0.79 to 1.79 dl/g;

the coefficient of viscosity of a tetrahydrofuran solution of the polycarbonate copolymer having a concentration of 10 wt % at a temperature of 20° C. is less than 500 cp; and when the reduction viscosity is taken as X, the coefficient of viscosity is not more than a value (Y) calculated by the following equation:

$Y=14.301 \times e^{2.2781X}$, wherein e is the base of natural logarithm (Napier's constant).

4. The polycarbonate copolymer according to claim 1, wherein the group represented by the formula (2a) is the following group:

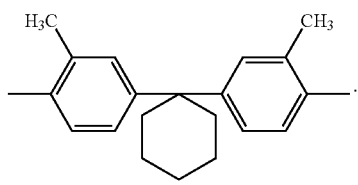

5. A coating liquid comprising the polycarbonate copolymer according to claim 1 and an organic solvent.

6. An electrophotographic photoreceptor in which a photosensitive layer is provided on a conductive base, wherein the photosensitive layer comprises, as one component, the polycarbonate copolymer according to claim 1.

* * * * *